US006065497A

United States Patent [19]

Tsou

[11] Patent Number: 6,065,497

[45] Date of Patent: May 23, 2000

[54] PNEUMATIC CONTROL ASSEMBLY

[76] Inventor: Eric Tsou, 7F, No. 56, Lane 103, Sec. 2, Nei Hu Road, Taipei, Taiwan

[21] Appl. No.: 09/064,284

[22] Filed: Apr. 22, 1998

[51] Int. Cl.[7] .......... F16D 31/02

[52] U.S. Cl. .......... 137/636.1; 60/433

[58] Field of Search .......... 60/433, 434; 91/521, 91/523; 137/637, 637.1, 636.1

[56] References Cited

U.S. PATENT DOCUMENTS 5,305,782 4/1994 Kipling et al. .......... 137/596

*Primary Examiner*—Edward K. Look
*Assistant Examiner*—Thomas E. Lazo
*Attorney, Agent, or Firm*—Proskauer Rose LLP

[57] ABSTRACT

A pneumatic control assembly for controlling a hydraulic power device includes a power control rod and at least one direction control rod. The power control is movable between an engaged position and a disengaged position to activate/de-activate a hydraulic fluid supply source for supply of hydraulic fluid to the hydraulic power device. The direction control rod is movable among a forward position, a neutral position, and a backward position wherein the forward position corresponds to driving the hydraulic power device in an working stroke to work, the backward position corresponds to moving the hydraulic power device in a returning stroke and the neutral position is between the forward position and backward position and corresponding to having the hydraulic power device maintained stationary. A peg is provided on the power control rod. The direction control rod has a projection arranged and dimensioned corresponding to the peg so that when the direction control rod is moved from the neutral position toward the backward position, the peg is drivingly engageable by the projection of the direction control rod in order to drive the power control rod to move with the direction control rod from the engaged position toward the disengaged position.

12 Claims, 25 Drawing Sheets

PNEUMATIC CONTROL ASSEMBLY

FIELD OF THE INVENTION

The present invention relates generally to the control of hydraulic power devices and in particular to a pneumatic control assembly for automatically shutting down the supply of high pressure hydraulic fluid when the hydraulic power device is in a returning stroke so as to enhance the operation safety of the hydraulic device.

BACKGROUND OF THE INVENTION

Heavy power devices which output great work or are capable to move heavy objects are very common, especially at construction sites or steel workshops, such as a rear-dump truck or hydraulic crane track. To obtain a great power output, most of the heavy power devices are operated hydraulically. A hydraulic power system requires a pump to pressurize the hydraulic fluid and thus supply the high pressure hydraulic fluid that is needed in operating the hydraulic power device. The pump may be driven by means of an electrical motor or an engine. The pump has to be turned on before the hydraulic power device is operated or the pump has to maintain operating in order to supply the high pressure hydraulic fluid. The pump has to be stopped once the supply of high pressure hydraulic fluid is no longer needed and this may be done by means of for example a clutch or the like coupled between the pump and the motor/engine.

In a regular hydraulically operated device, a controller is provided for the operator to control the supply of the high pressure hydraulic fluid and the moving direction of the hydraulic device. Such a controller may be electrically or pneumatically operated. For certain hydraulic power devices, pneumatic power is more readily available for control purpose, such as a rear-dump truck which itself is equipped with an air compressor or similar device. In such a case, a pneumatic control assembly has advantages over the electrically operated controller.

The control assembly of a hydraulic power device usually comprises two parts, one of which controls the supply of the hydraulic fluid and the other controls the moving direction of the hydraulic power device. It often happens that when the operator switches the direction control to the retracting direction to move the hydraulic power device in the returning stroke which in certain cases requires no supply of the hydraulic fluid, he or she inadvertently leaves the power control in the engaged position which makes the pump to continue supplying the hydraulic fluid to the hydraulic power device. In such a case, damage to the hydraulic power device may occur or even worse, the hydraulic power device may be accidentally actuated and thus causing property and live casualty/damage.

To overcome such a problem, devices that couple the power control of a pneumatic control assembly to the direction control, especially in moving the hydraulic power device in the returning stroke, are available in the market. However, such devices are very complicated in construction and hard to maintain and thus are impractical for the environments of for example the construction site. Thus, it is desired to have a device for coupling the power control to the direction control which is simple in construction and thus cheap in cost and easy in maintenance.

SUMMARY OF THE INVENTION

Therefor, an object of the present invention is to provide a pneumatic control assembly for hydraulic power device which allows the power control to be automatically shut down when the direction control is switched to the retraction direction of the returning stroke of the hydraulic power device that requires no supply of high pressure hydraulic fluid so as to enhance the operation safety of the hydraulic power device.

Another object of the present invention is to provide a pneumatic control assembly which comprises a device for coupling the power control of the pneumatic control assembly to the direction control which has a simple construction and thus is cheap in cost.

A further object of the present invention is to provide a pneumatic control assembly which comprises a device to effectively lock the power control in the disengaged position so as to avoid accidents and/or damages caused by an inadvertent actuation of the power control.

Yet a further object of the present invention is to provide a pneumatic control assembly in which a time elapse is provided between the switching of the direction control to the retraction direction and the automatic shut-down of the power control so that the power control is completely shut down well before the direction control is switched to the retraction direction to provide an even much safer operation of the hydraulic power device.

In accordance with the present invention, there is provided a pneumatic control assembly adapted to control the operation of a hydraulic power device, comprising a power control rod and at least one direction control rod of which the power control rod is movable between an engaged position and a disengaged position to activate/de-activate a high pressure hydraulic fluid supply for providing high pressure hydraulic fluid to the hydraulic power device and the direction control rod is movable among a forward position, a neutral position and a backward position, the forward position corresponding to having the hydraulic power device moving in for example a working stroke in an extension direction to output work, the backward position corresponding to having the hydraulic power device to move in the retraction direction in a returning stroke and the neutral position corresponding to having the hydraulic power device maintain stationary. The power control rod has a peg mounted thereon which is engageable with a projection formed on the direction control rod when the direction control rod is moved from the neutral position toward the backward position so as to drive the power control rod to move from the engaged position to the disengaged position. The power control rod is designed such that when it is actuated by the direction control rod to move from the engaged position to the disengaged position, it may quickly move so as to reach the disengaged position much earlier than when the direction control rod reaches the backward position.

BRIEF DESCRIPTION OF THE DRAWINGS

The present invention will be better understood from the following description of a preferred embodiment thereof with reference to the attached drawings, wherein.

DETAILED DESCRIPTION OF THE PREFERRED EMBODIMENT

Figure 1:
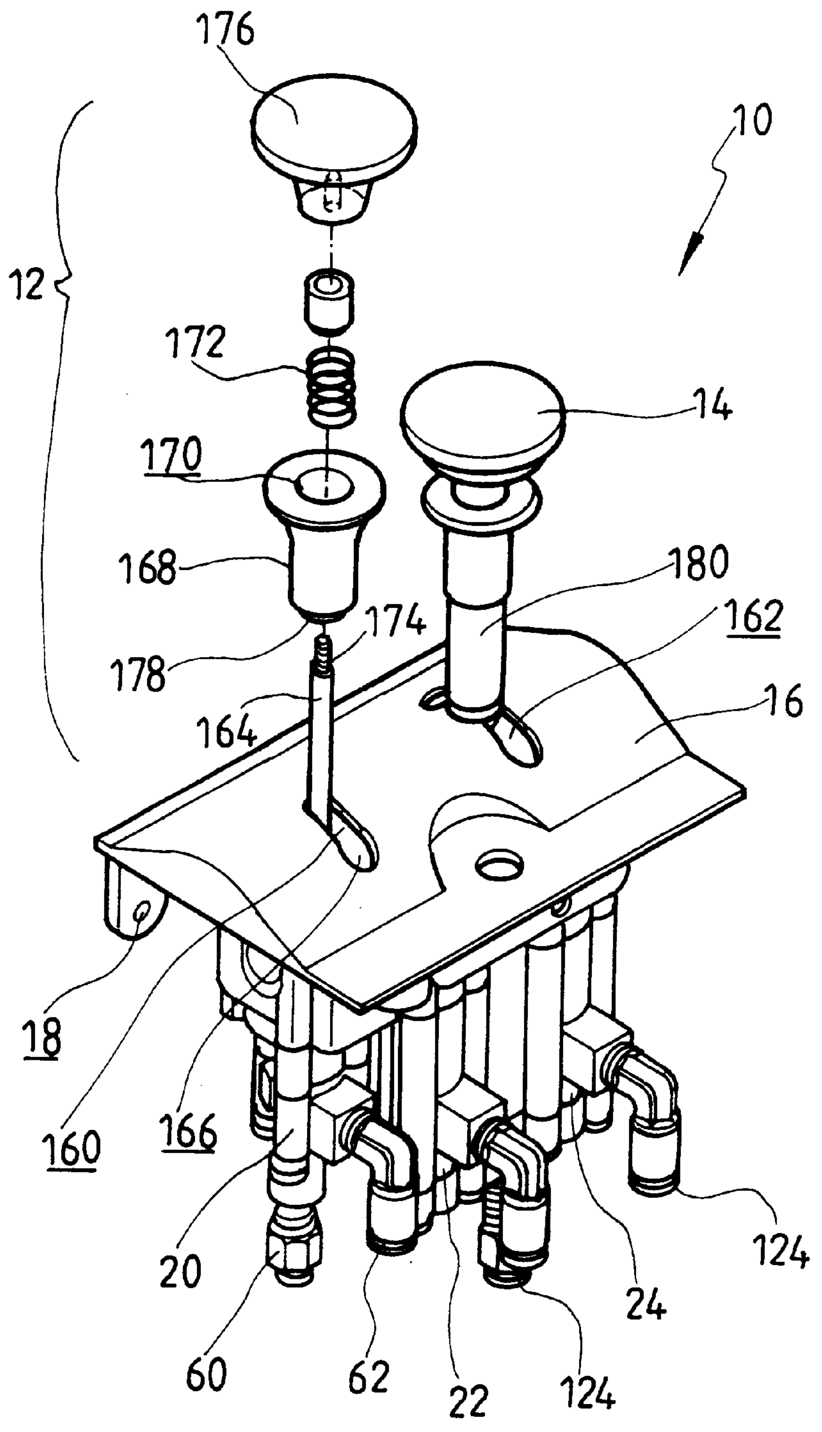
FIG. 1 is a perspective view showing a pneumatic control assembly constructed in accordance with the present invention adapted to control a hydraulic power device which is not shown in the drawing.

With reference to the drawings and in particular to FIG. 1, wherein a pneumatic control assembly in accordance with the present invention, generally designated at 10, is shown, the pneumatic control assembly 10 comprises a power control rod 12 and at least one direction control rod 14. The pneumatic control assembly 10 is particularly suitable for the control of a hydraulic power device (not shown) which receives high pressure hydraulic fluid from a supply source (not shown) under the control of the power control rod 12 so as to move in a desired direction in response to the operation of the direction control rod 14.

The power control rod 12 is movable between an engaged position and a disengaged position to establish and cut off the supply of the high pressure hydraulic fluid to the hydraulic power device. The direction control rod 14 is movable among a forward position, a neutral position and a backward position with the neutral position in between the forward position and the backward position so that the direction control rod 14 is movable in a first direction toward the forward position to actuate the hydraulic power device to move in a "forward direction" in a working stroke and that the direction control rod 14 is also movable in a second, opposite direction toward the backward position to actuate the hydraulic device to move in a "backward direction" in a returning stroke. The neutral position is a position where the hydraulic device is kept stationary temporarily.

The terms "forward direction" and "backward direction" as used herein are referred to two generally opposite directions that a hydraulic power device may be moved and may be regarded as the working stroke and returning stroke of the hydraulic power device. For example, a rear-dump truck is equipped with a hydraulic lifter to raise one side of a tipper container for dumping objects received therein. The "forward direction" may be the direction where the tipper container is raised by the hydraulic lifter (the working stroke), while the "backward direction" is the direction where the tipper container is lowered down back to its resting condition (returning stroke). The neutral position of the direction control rod 14 is thus associated with a condition where the hydraulic power device (the tipper container) moves neither in the forward direction, nor in the backward direction, but is kept stationary.

Although in the following description, only a single direction control rod is illustrated, yet it is apparent to those having ordinary skill to extend the following description to a pneumatic control assembly having more than one direction control rod. For example, there are cases where it requires to actuate the hydraulic device to move in two orthogonal directions and in such cases, two direction control rods may be used to respectively move the hydraulic power device in the two orthogonal directions. The two direction control rods may share a common power control rod or alternatively, they may have respective power control rod associated therewith and these are all potentially envisioned by those skilled in the art and should be regarded as part of the invention.

Preferably, the power control rod 12 and the direction control rod 14 are arranged on and supported by a support member 16 which may then be fixed to a control panel of a control room or cabin (not shown). Fixing the support member 16 to the control panel may be achieved by any suitable known means, such as bolts (not shown) extending through holes 18 on the support member 16 and tightened to the control panel.

The power control rod 12 is coupled to a power control valve 20 which is arranged to be open when the power control rod 12 is at the engaged position to allow a working fluid (for example compressed air) to flow therethrough for activating the operation of the hydraulic fluid supply source which supplies the high pressure hydraulic fluid to the hydraulic power device and the power control valve 20 is closed when the power control rod 12 is at the disengaged position where the flow of the working fluid (compressed air) is cut off and the supply of the high pressure hydraulic fluid to the hydraulic power device is stopped.

The direction control rod 14 is coupled to two direction control valves 22 and 24 which are respectively used to control two hydraulic fluid ports (not shown) of the hydraulic power device by means of flows of the working fluid which may be a gaseous fluid, such as compressed air, through the valves 22 and 24. For example, when the first direction control valve 22 is open, one of the hydraulic fluid ports of the hydraulic power device which may be for example a hydraulic cylinder is open to allow the high pressure hydraulic fluid to flow into the hydraulic power device and forcing the hydraulic power device to move in the working stroke and work, such as moving in the forward direction. On the other hand, when the second direction control valve 24 is open which causes the other hydraulic fluid port of the hydraulic device to open, the high pressure hydraulic fluid inside the hydraulic power device may then be properly expelled out thereof, allowing the hydraulic power device to move in the backward direction in the returning stroke. To avoid the ports of the hydraulic power device to be opened at the same time, causing problem and confusion in controlling the hydraulic power device, when the direction control rod 14 is at the neutral position, both the first direction control valve 22 and the second direction control valve 24 are closed; when the direction control rod 14 is at the forward position, the first direction control valve 22 is opened and the second direction control valve 24 is closed; and when the direction control rod 14 is at the backward position, the first direction control valve 22 is closed and the second direction control valve 24 is opened. In other words, the first and second direction control valves 22 and 24 may not be opened at the same time.

Since the supply of the high pressure hydraulic fluid is controlled by the power control valve 20, when the first direction control valve 22 is opened (namely, the direction control rod 14 is at the forward position), the power control valve 20 must be opened too to supply the high pressure hydraulic fluid to the hydraulic power device. When the first direction control valve 22 is closed and the second direction control valve 24 is opened (namely, the direction control rod 14 is at the backward position), the power control valve 20 may be closed if the design of the hydraulic power device does not require a back pressure (namely, the hydraulic pressure acting on the hydraulic device to move it in the backward direction) to move the hydraulic device in the backward direction or the power control valve 20 may be opened if the hydraulic power device needs a back pressure to move in the backward direction. For example, in certain cases, the hydraulic power device may be moveable in the backward direction by being acted upon by the gravity and in such cases, the power control valve 20 may be closed. However, in other cases, a back pressure is needed for the hydraulic power device to move and work in the backward direction.

In accordance with the present invention, the power control rod 12 and the direction control rod 14 is coupled to each other so that in the cases that no back pressure is needed to move the hydraulic power device in the backward direction, when the direction control rod 14 is moved from the neutral position toward the backward position, the power control rod 12 is driven thereby to shift from the engaged position toward the disengaged position in order to cut off the supply of the high pressure hydraulic fluid. In accordance with the present invention, the shift of the power control rod 12 from the engaged position to the disengaged position is done in a sudden and quick "leap". In other words, the power control rod 12, once actuated to move beyond a pre-set transition point between the engaged position and the disengaged position, moves abruptly toward the disengaged so that the power control rod 12 reaches the disengaged position earlier than when the direction control rod 14 is manually moved to the backward position.

In accordance with a preferred embodiment of the present invention, the coupling between the power control rod 12 and the direction control rod 14 comprises a peg 26 (see FIG. 2) extending from the power control rod 12 in a direction toward the direction control rod 14 and a projection 28 (see FIG. 3) formed on the direction control rod 14 and positioned corresponding to the peg 26. The peg 26 and the projection 28 are dimensioned and positioned so as to be contact engageable with each other, when the direction control rod 14 is moved from the neutral position toward the backward position, in such a way that the projection 28 drives the peg 26 to move therewith which in turn moves the power control rod 12 toward the disengaged position. However, when the direction control rod 14 is moved from the neutral position toward the forward position, the peg 26 and the projection 28 are arranged to not interfere with each other so that the movement of the direction control rod 14 toward the forward position does not affect or causes any movement of the power control position 12 which is located at the engaged position.

In accordance with another aspect of the present invention, the power control rod 12 is constructed so that when it is moved from the engaged position toward the disengaged position by being driven by the movement of the direction control rod 14, it moves substantially synchronously with the direction control rod 14 and once it reaches or gets slightly beyond a pre-set transition point between the engaged position and the disengaged position, the power control rod 12 leaps suddenly and quickly from the transition point toward the disengaged position, as mentioned above. Thus, the power control rod 12 moves much faster than the direction control rod 14 after the transition point and reaches the disengaged much earlier than when the direction control rod 14 reaches the backward position. In this way, before the direction control rod 14 reaches the backward position, the supply of the high pressure hydraulic fluid to the hydraulic device has already cut off by the power control valve 20 controlled by the power control rod 12 reaching the disengaged position.

The quick movement of the power control rod 12 from the transition point toward the disengaged position imposes a greater momentum on the power control rod 12 so as to allow the power control rod 12 to overcome any likelihood of being stopped or slowed down by the friction or other resistance applied to the power control rod 12 during its movement toward the disengaged position and the power control rod 12 may move in a non-stopped manner directly to the disengaged position to effectively and positively cut off the supply of the high pressure hydraulic fluid. In other words, an operator of the pneumatic control assembly 10 needs only to manually move the direction control rod 14 from the neutral position toward the backward position a distance sufficient to position the power control rod 12 slightly beyond the transition point, the power control rod 12 may then automatically "leap" to the disengaged position very quickly and the likelihood of being stopped midway between the transition point and the disengaged position is significantly reduced or eliminated. The time elapse between when the power control rod 12 reaches the disengaged position and when the direction control rod 14 reaches the backward position provides a safer way of operating the pneumatic control assembly 10 in controlling the hydraulic power device. This will be further described.

In accordance with the present invention, the movements of the power control rod 12 and the direction control rod 14 are respectively guided and controlled by a first elongated slot 160 and a second elongated slot 162 formed on the support member 16 with the power control rod 12 and the direction control rod 14 received within and extending through the slots 160 and 162 in such a way to be movable in the lengthwise direction of the slots 160 and 162.

The first elongated slot 160 has a predetermined length and a predetermined width (which is the dimension in a direction normal to the length) and the length thereof has two lengthwise ends respectively corresponding to the engaged position and the disengaged position of the power control rod 12. The power control rod 12 comprises an elongated bar 164 having a cross-sectional size receivable within the width of the first elongated slot 160 so as to allow the power control rod 12 to be movable relative to and along the first elongated slot 160 between the two lengthwise ends which provides means for guiding the power control rod 12 moving between the engaged position and the disengaged position.

The lengthwise end of the first elongated slot 160 corresponding to the disengaged position comprises an expanded hole 166 having a diameter greater than the width of the first elongated slot 160. The power control rod 12 comprises a hollow cylindrical locking member 168 which is movably fit over the elongated bar 164 with a biasing member, such as a helical spring 172 encompassing the elongated bar 164 received within the hollow interior space 170 of the locking member 168. The elongated bar 168 has a threaded top end 174 to which an inner-threaded retainer 176 is threadingly mounted to hold the spring 172 and the locking member 168 on the elongated bar 164. The spring 172 is pre-compressed between the retainer 176 and the locking member 168 to bias the locking member 168 toward the support member 16 and force an end of the locking member 168 that faces toward the support member 16 against the support member 168. The locking member 168 comprises a locking ring 178 fixed to the end of the locking member 168 that faces toward the support member 16. The locking ring 178 surrounds and is movable along the elongated bar 164. The locking ring 178 has a diameter greater than the width of the first elongated slot 160, but smaller than the diameter of the expanded hole 166 so that the locking ring 178 is supported and movable on the support member 16 when the power control rod 12 is moved along the first elongated slot 160. Once the power control rod 12 reaches the disengaged position, the biasing spring 172 forces the locking ring 178 into the expanded hole 166 and thus locking the power control rod 12 at the disengaged position and prohibiting the power control rod 12 from moving relative to the first elongated slot 160. This forms locking means for fixing the power control rod 12 at the disengaged position. To release the power control rod 12 from the disengaged position, simply manually forcing the locking member 168 against the biasing spring 172 toward the retainer 176 so as to disengage the locking ring 178 from the expanded hole 166 allows the power control rod 12 to resume relative movability with respect to the first elongated slot 160 and this is the un-locking operation of the power control rod 12.

The locking means that fixes the power control rod 12 at the disengaged position provides a safety in operation which prevents the power control rod 12 from being unexpectedly shifted to the engaged position by being accidentally contacted. Furthermore, the locking means also serves as a measure to stop and precisely position the power control rod 12 at the disengaged position when the power control rod 12 is quickly moved from the transition point to the disengaged position.

It should be noted that the power control rod 12 is not provided with a locking device or a large diameter hole at the end of the elongated slot 160 that corresponds to the engaged position so that the power control rod 12 may be readily moved away from the engaged position. Such an arrangement allows the power control rod 12 to be moved from the engaged position toward the transition point with the movement of the direction control rod 14 by means of the engagement between the peg 26 of the power control rod 12 and the projection 28 of the direction control rod 14 when the direction control rod 14 is moved from the neutral position toward the backward position and no manual un-locking operation is needed.

Similarly, the direction control rod 14 comprises an elongated bar (not shown) extending through the second slot 162 in such a way to be movable therein so as to allow the direction control rod 14 to be movable among the forward position, the neutral position and the backward position. The second slot 162 has two ends, respectively corresponding to the forward position and the backward position and each having an expanded hole formed thereon to serve as locking means. A third expanded hole is formed on the second slot 162 between the two ends of the second slot 162 to define the neutral position. Similar to the power control rod 12, the direction control rod 14 is also provided with a locking member 180 which is manually movable along the elongated bar of the direction control rod 14 for selectively engaging the expanded hole of any of the forward position, the neutral position and the backward position for locking the direction control rod 14 thereat. Such a locking member allows the operator to secure/release the direction control rod 14 at/from the forward position, the neutral position or the backward position by operating the locking member 180.

Due to the fact that when the direction control rod 14 is moved to the backward position of the second slot 162, it is secured thereat by the locking member 180 and due to that the peg 26 of the power control rod 12 is engaged by the projection 28 of the direction control rod 14, when the direction control rod 14 is not released from the backward position, even though the power control rod 12 is released from the locking function provided by the locking member 162 at the disengaged position, the power control rod 12 is still incapable to move away from the disengaged position toward the engaged position by being held in position by the projection 28 of the direction control rod 14 which engages the peg 26 of the power control rod 12.

Further, the direction control rod 14 is preferably provided with a biasing spring 29 (see FIG. 3) which helps urging the direction control rod 14 to the neutral position and the securing the direction control rod 14 thereat. Such an arrangement provides a further operation safety in case that the direction control rod 14 is moved to be very close to but not precisely locked at the backward position (due to the inadvertency of the operator). Under such a situation, if the power control rod 12 is accidentally moved toward the engaged position, owing to the engagement between the peg 26 of the power control rod 12 and the projection 28 of the direction control rod 14, the direction control rod 14 is driven by the power control rod 12 toward the neutral position and by means of the provision of the biasing spring 29, the direction control rod 14 is urged into and securely held in the neutral position when the power control rod 12 is approaching the engaged position. This provides a further operation safety of the pneumatic control assembly 10.

Figure 2:
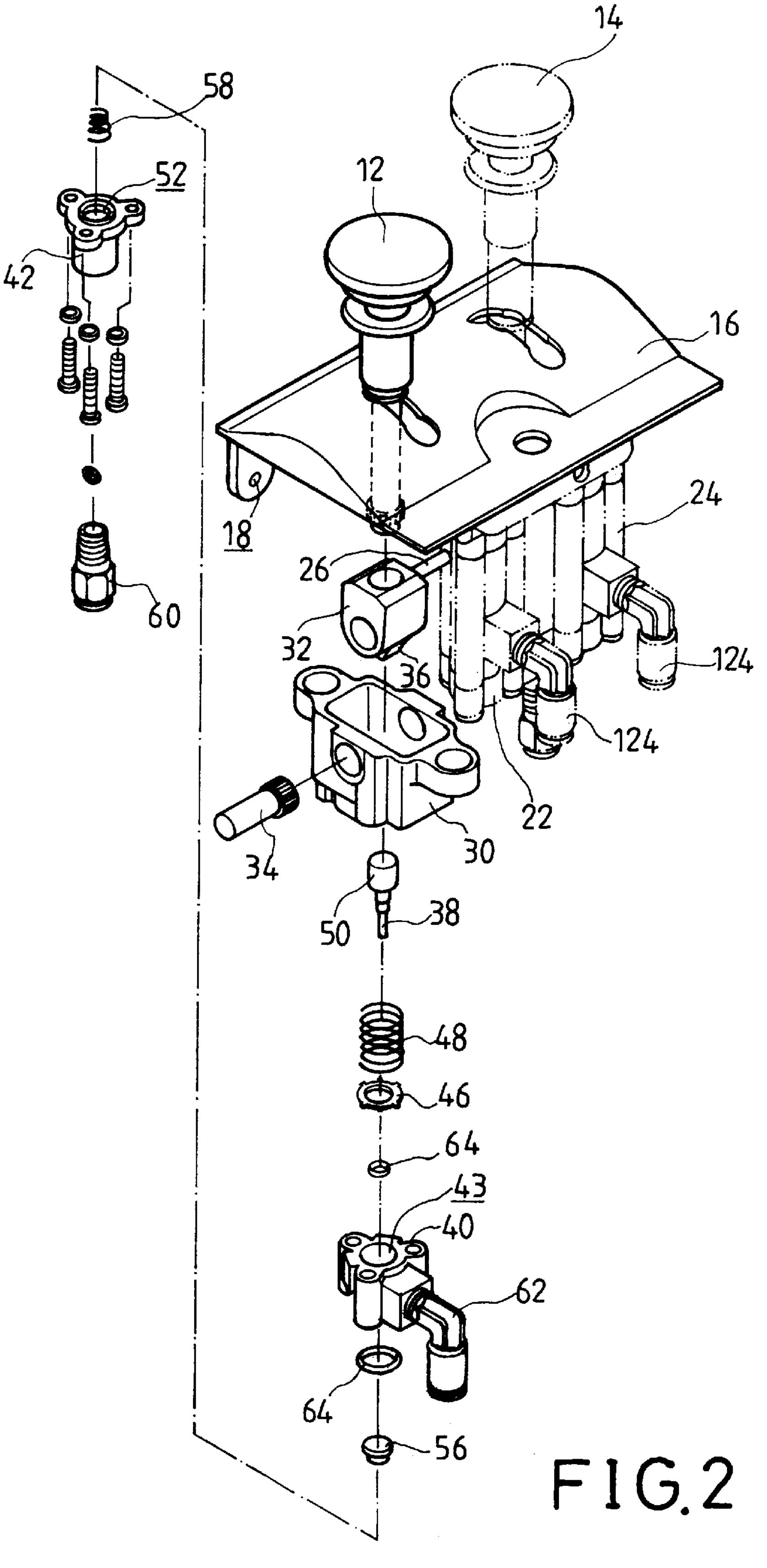
FIG. 2 is a partially exploded perspective view of the pneumatic control assembly in accordance with the present invention, showing the detailed structure of the power control rod.
Figure 4A:
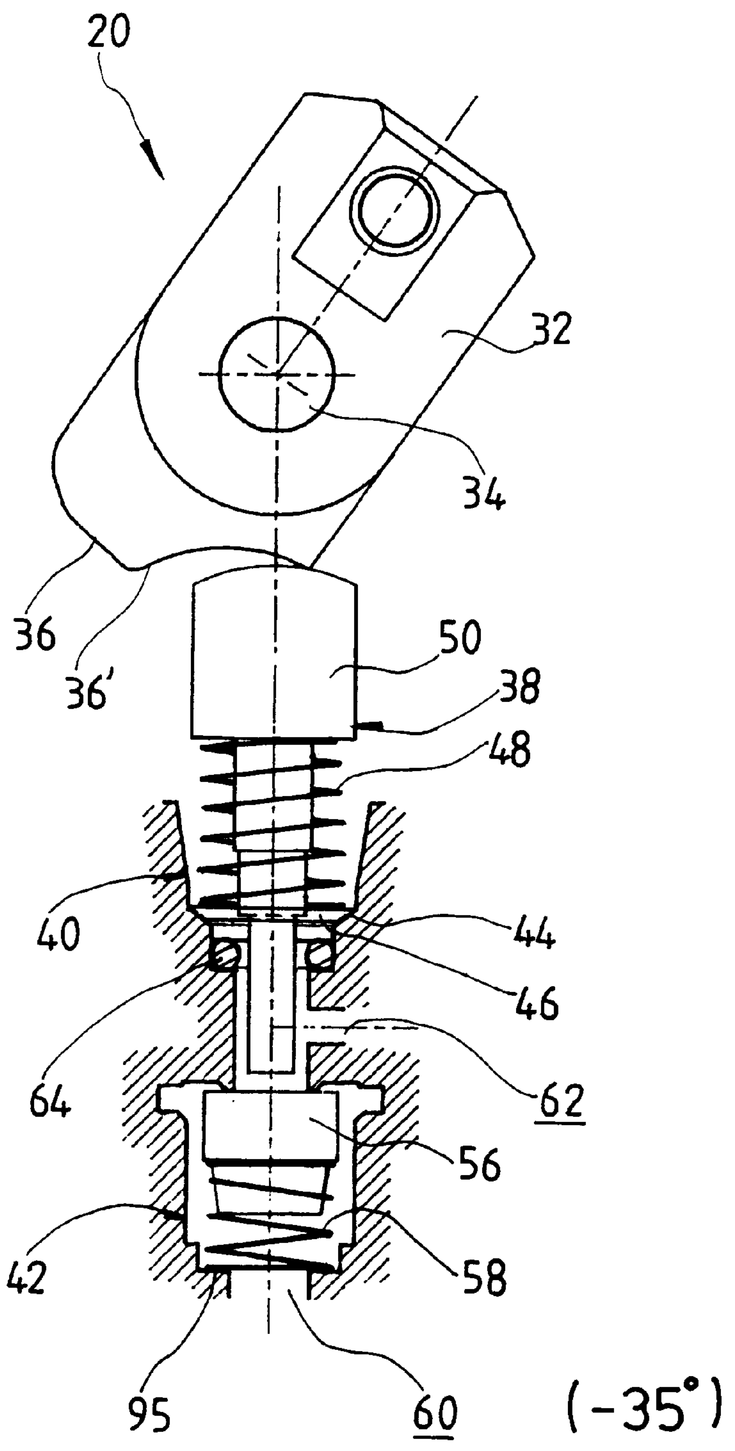
FIGS. 4–10 are cross-sectional views showing different operation conditions of the pneumatic control assembly of which the drawings which carry the suffix "A" are associated with the power control valve, suffix "B" the first direction control valve, and suffix "C" the second direction control valve.

With reference to FIG. 2, which shows an exploded perspective view of the power control valve 20 for the explanation of the power control valve 20 and also referring to FIG. 4A, the power control valve 20 comprises a cam holder 30 which is a hollow member having an interior space accommodating therein a cam 32. The cam 32 is pivotally supported inside the cam holder 30 by means of a pivot 34 to be rotatable therein. The cam 32 has a contour defining a camming surface 36 to drivingly engage an expanded end 50 of an acting rod 38 of the power control valve 20. The expanded end 50 of the acting rod 38 serves as the cam follower of the cam 32. The power control valve 20 comprises a body having a first section 40 and a second section 42. The first section 40 has a central bore 43 with a circumferential shoulder 44 formed therein for supporting an end of a helical spring 48. The spring 48 encompasses the acting rod 38 and has an opposite end supported on an under side of the expanded end 50 thereof for supporting the acting rod 38 inside the bore 43 of the first section 40. The first section 40 is fixed to a lower opening (not shown) of the cam holder 30 to allow the expanded end 50 of the acting rod 38 to extend into the cam holder 30 for engaging the camming surface 36 of the cam 32. The movement of the power control rod 12 between the engaged position and the disengaged position rotates the cam 32 about the pivot 34 which in turn drives the acting rod 38 against the spring 48 by means of the camming action between the camming surface 36 of the cam 32 and the expanded end 50 of the acting rod 38. This moves the acting rod 38 relative to the valve body.

The second section 42 is fixed to the first section 40 to have a bore 52 of the second section 42 in fluid communication with the bore 43 of the first section 40. A plug 56 is movably received within the bore 52 of the second section 42 and is supported by a spring 58 inside the bore 52. The spring 58 has an end supported on a circumferential shoulder 95 inside the bore 52 and an opposite end engaging and supporting the plug 56. The second section 42 is provided with an inlet port 60 which extends from the bore 52 to outside the valve body to allow the working fluid (gas) to flow into the bore 52 of the second section 42. The plug 56 is biased by the spring 58 to block the connection between the bore 52 of the second section 42 and the bore 43 of the first section 40 (as shown in FIG. 4A) for preventing the working fluid from getting into the first section 40.

The acting rod 38 has a length such that when the acting rod 38 is acted upon by the camming surface 36, a remote end, which is the end of the acting rod 38 opposite to the expanded end 50 that engages the camming surface 36, is driven to contact and urge the plug 56 away from and thus opening the connection between the bores 43 and 52. As consequence, the working fluid is allowed to flow into the first section 40. The first section 40 is provided with an outlet port which is connected with external piping to conduct the working fluid that flows into the power control valve 20 to a desired point to activate the supply of the high pressure hydraulic fluid.

To prevent leakages of the working fluid occurring in the first section 40, the bore 43 of the first section 40 is provided with a sealing ring 64 surrounding the acting rod 38 to prohibit leakages between the acting rod 38 and the bore 43 of the first section 40. A seal holder 46 is provided to fix the sealing ring 64 in position inside the bore 43.

Thus, when the power control rod is manually moved from the disengaged position to the engaged position, the cam 32 that is coupled thereto is driven thereby to have the acting rod 38 moved against the spring 48 by means of the camming engagement between the camming surface 36 of the cam 32 and the expanded end 50 of the acting rod 38 and the remote end of the acting rod 38 engages the plug 56. The engagement between the acting rod 38 and the plug 56 effectively moves the plug 56 against the spring 58 to open the fluid communication channel between the inlet port 60 and the outlet port 62 and as a consequence, the working fluid of the power control valve 20 is then conducted to activate the supply of the high pressure hydraulic fluid.

Figure 9A:
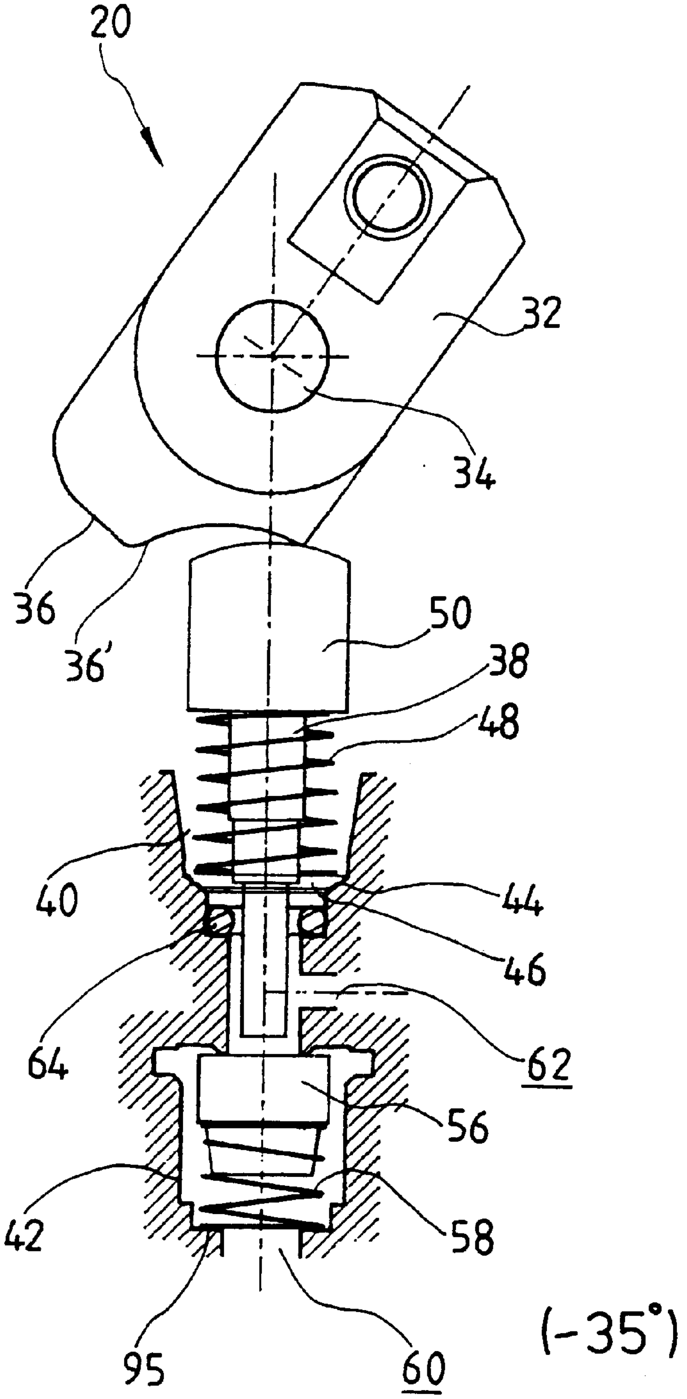
Figure 9B:
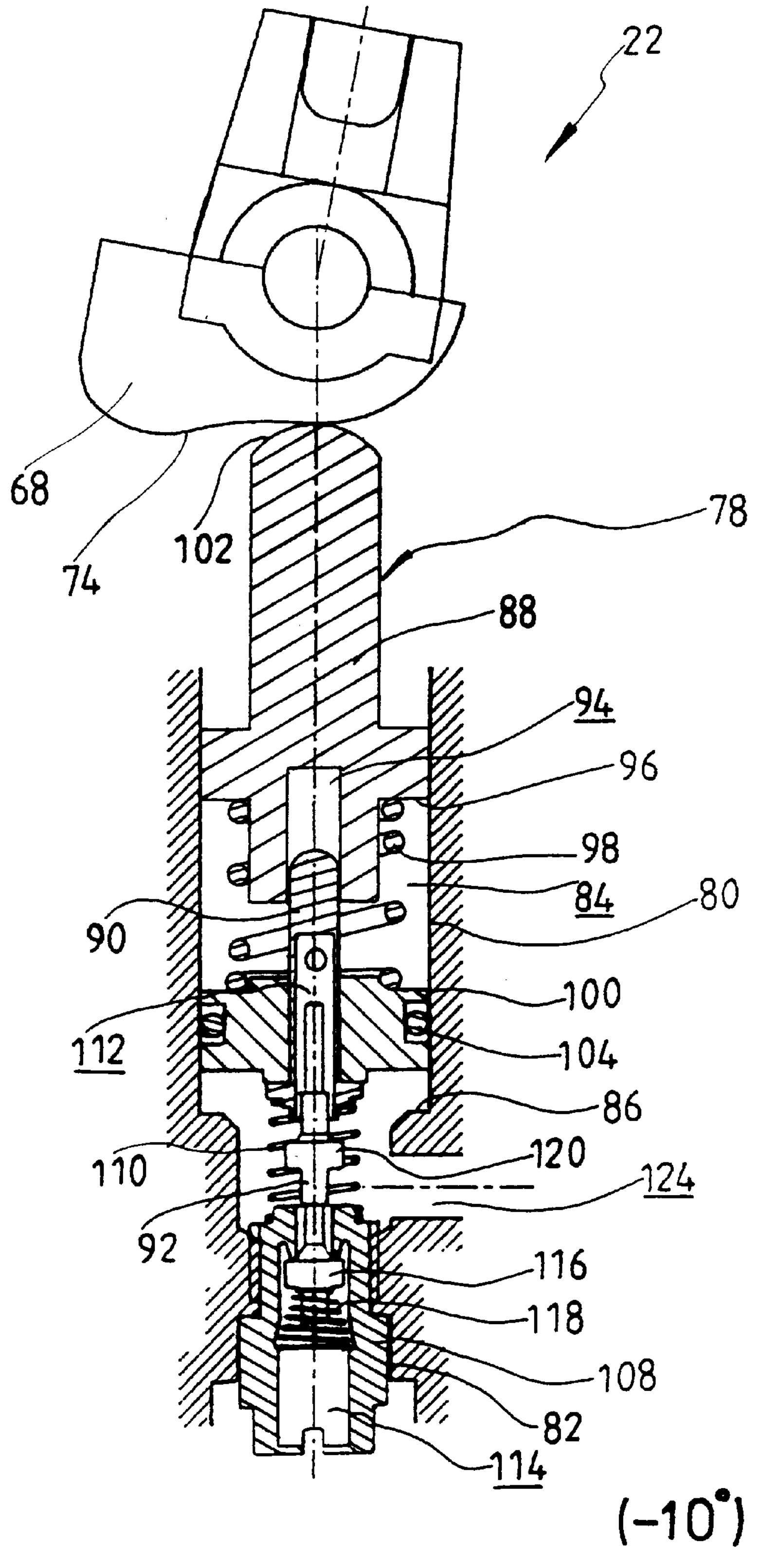
Figure 9C:
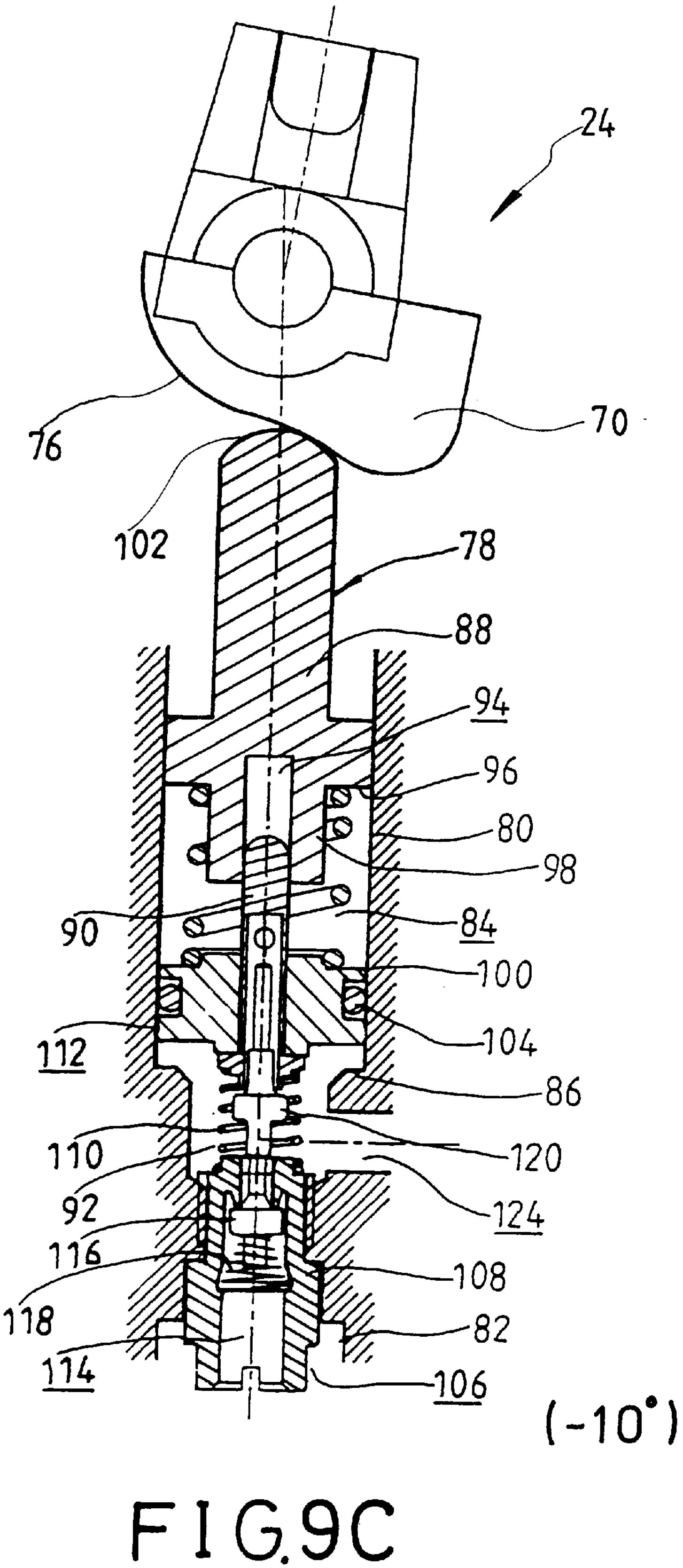
Figure 10A:
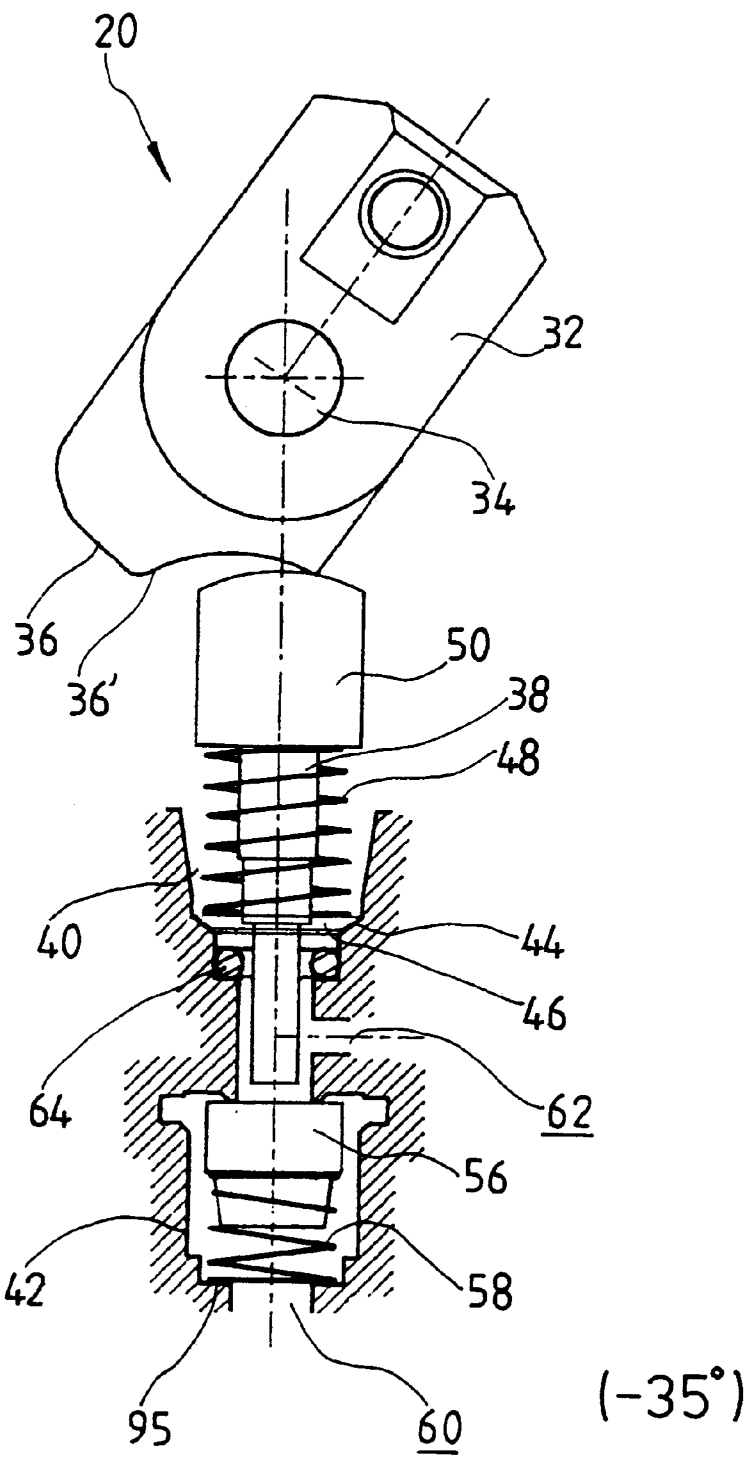
Figure 10B:
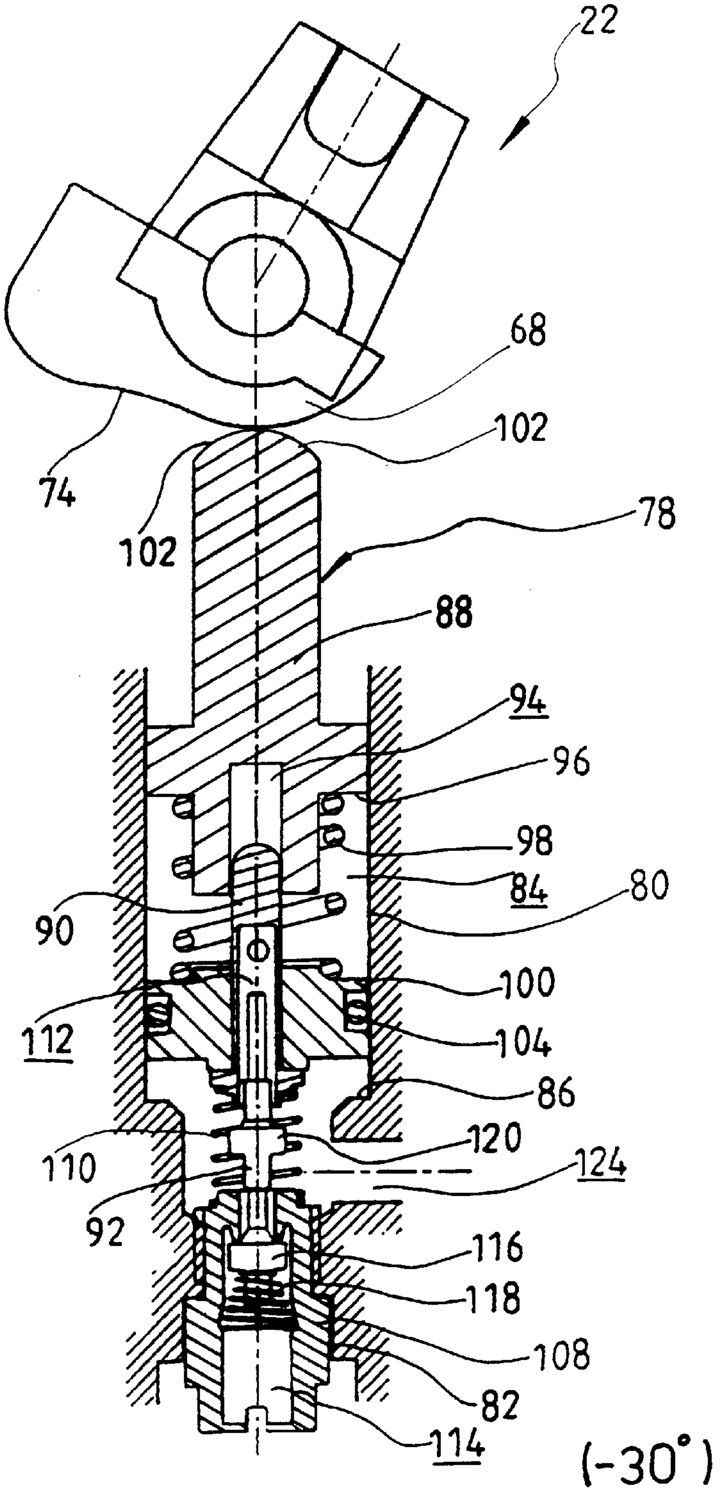

FIGS. 5A, 6A, 7A and 8A show the power control valve 20 in the open condition and FIGS. 9A and 10A show the power control valve 20 in the closed condition.

The direction control valves 22 and 24 may have the same construction as the power control valve 20 with the only difference in the contours of the cams thereof for the timing of opening/closing the valves 20, 22 and 24 may not be the same.

Figure 3:
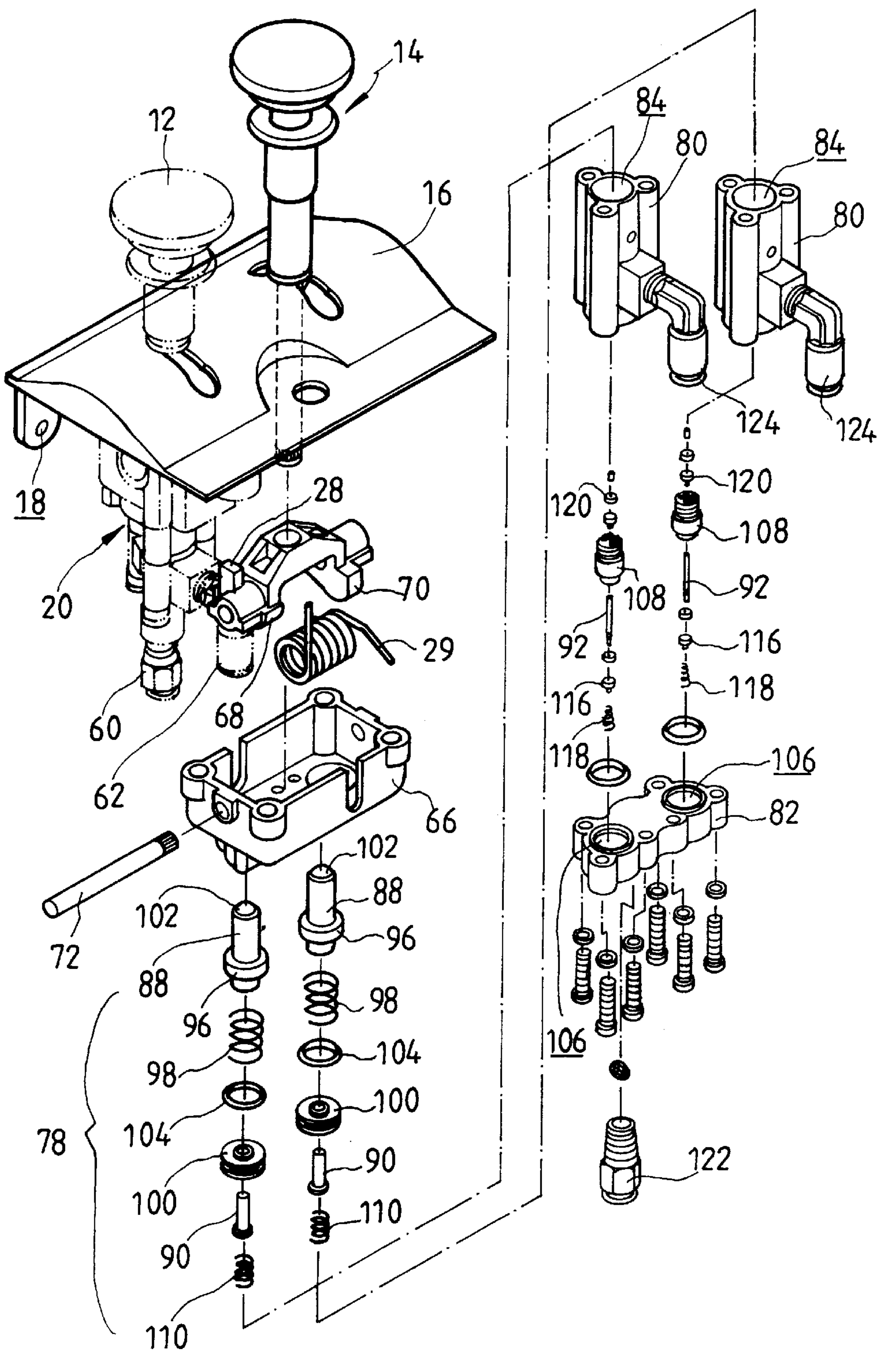
FIG. 3 is a partially exploded perspective view of the pneumatic control assembly in accordance with the present invention, showing the detailed structure of the direction control rod.

Alternatively, the direction control valves 22 and 24 may be of a more sophisticated construction as shown in FIG. 3 and will be described hereinafter. However, since the construction of the two direction control valves 22 and 24 are taken as the same in the preferred embodiment illustrated herein, the description may be, in certain paragraphs, directed to one of the two direction control valves 22 and 24, but is equally applicable to the other one of the two valves 22 and 24.

Figure 4B:
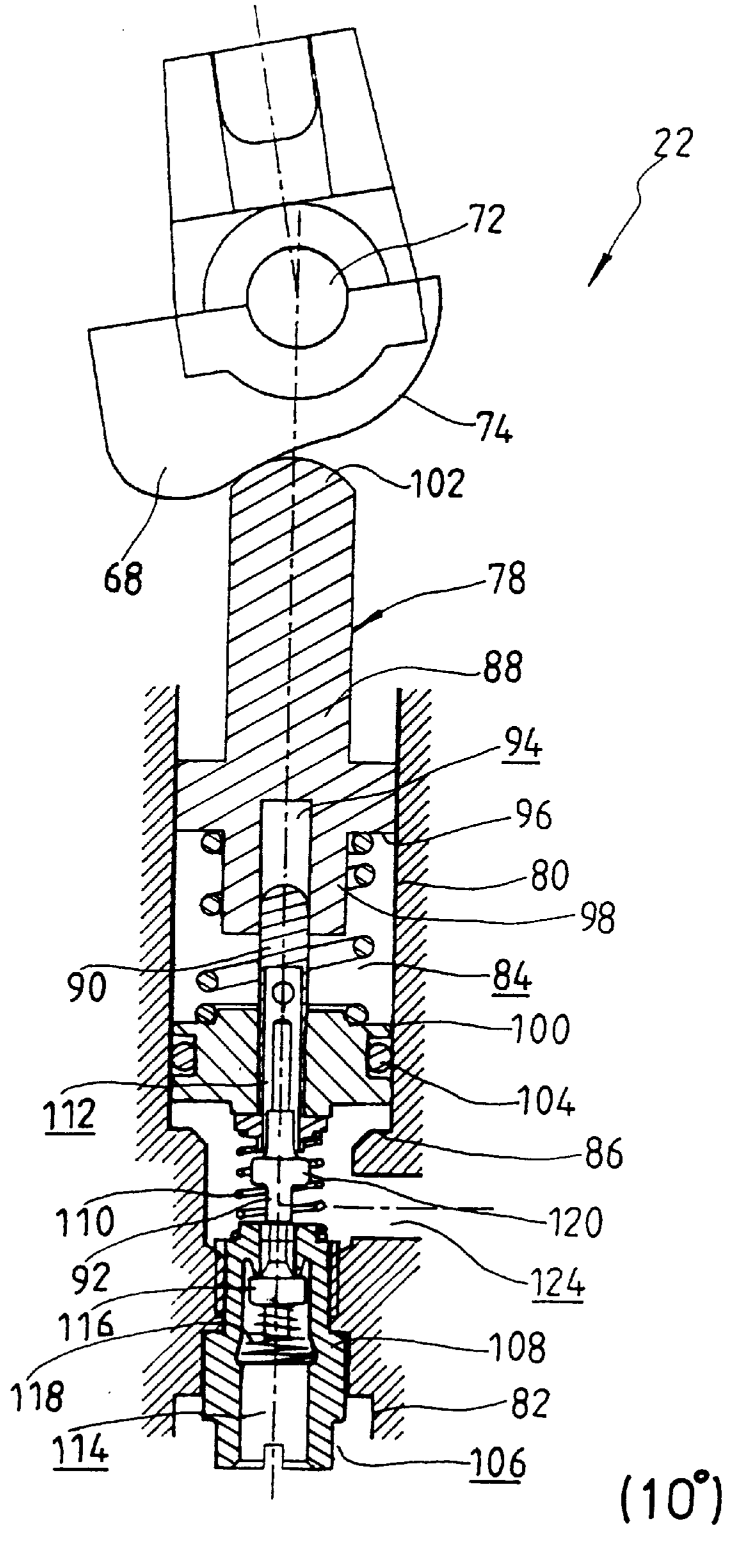
Figure 4C:
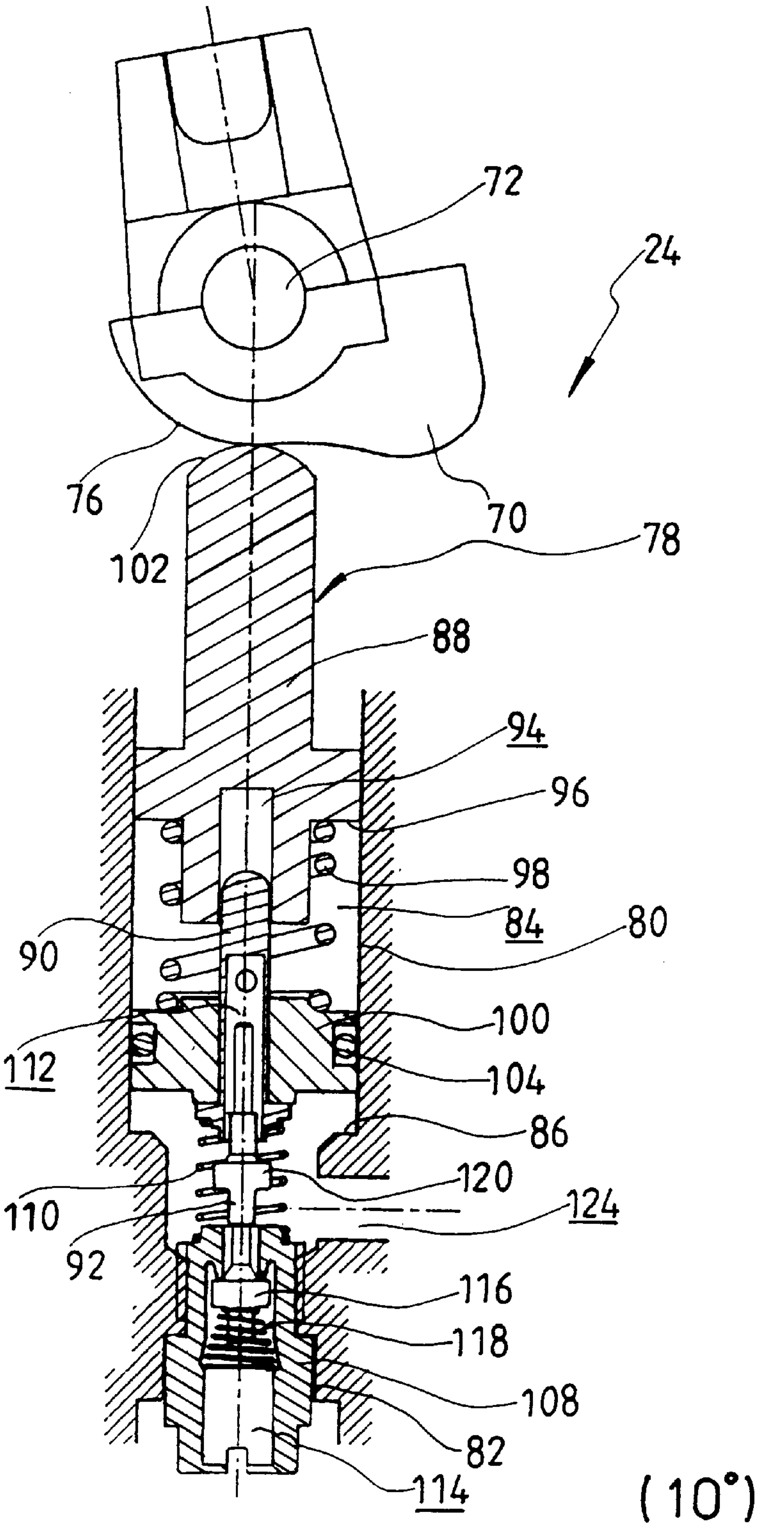

The direction control valves 22 and 24 have a common cam holder 66 which is a hollow member for receiving therein cams 68 and 70 of the direction control valves 22 and 24. Since the first direction control valve 22 and the second direction valve 24 are designed not to be opened at the same time, the cams 68 and 70 have contours that are opposite to and preferably substantially symmetrical with each other about a contour center (see FIGS. 4B and 4C) which may be regarded as the neutral position of the direction control rod 14 and in this case, the backward position and the forward position of the direction control rod 14 is substantially symmetrical about the neutral position.

Although it is shown in the preferred embodiment illustrated in the drawings that the cams 68 and 70 of the first and second direction control valves 22 and 24 share the same cam holder 66, it is possible to provide each of the cams 68 and 70 with an individual cam holder for independently accommodating the cams 68 and 70.

The cams 68 and 70 are pivotally supported inside the cam holder 66 by means of a pivot 72 to be rotatable therein. In the preferred embodiment illustrated, the pivot 72 is common to both direction control valves 22 and 24, but in the case that the cams 68 and 70 have their own cam holder, then there could be separate (but preferably co-axial) pivots for supporting the cams 68 and 70 within respective cam holders.

Each of the cams 68 and 70 is provided with a cam contour which defines a camming surface 74 or 76 engaging an acting rod assembly 78 of the respective one of the two direction control valves 22 and 24 for controlling the switching of the valves 22 and 24 between open condition and closed condition. The two cams 68 and 70 are commonly coupled to the direction control rod 14 so as to be controlled by the movement of the direction control rod 14 to rotate about the pivot 72 for opening/closing the direction control valves 22 and 24.

The direction control valve 22 (direction control valve 24 being the same) comprises a valve body having a first section 80 and a second section 82. The first section 80 comprises a bore 84 having circumferential shoulder 86 formed therein serving as a stop to be described. The acting rod assembly 78 is movably received within the bore 84 of the first section 80, comprising a first rod 88, a second rod 90 and a third rod 92.

Figure 3A:
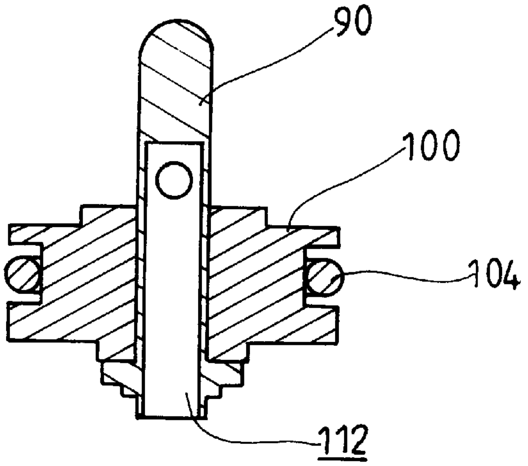
FIG. 3A is a cross-sectional view showing a second rod of the acting rod assembly of the direction control valve adapted in the pneumatic control assembly of the present invention.
Figure 6A:
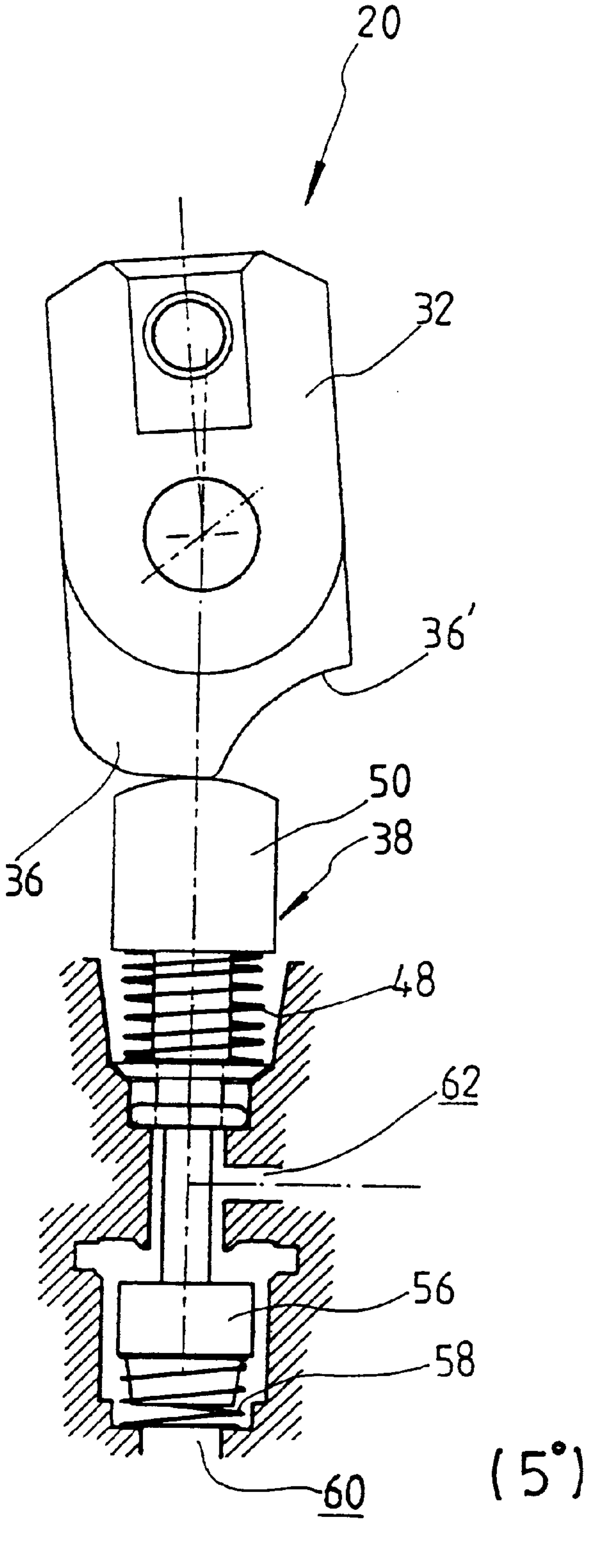
Figure 6B:
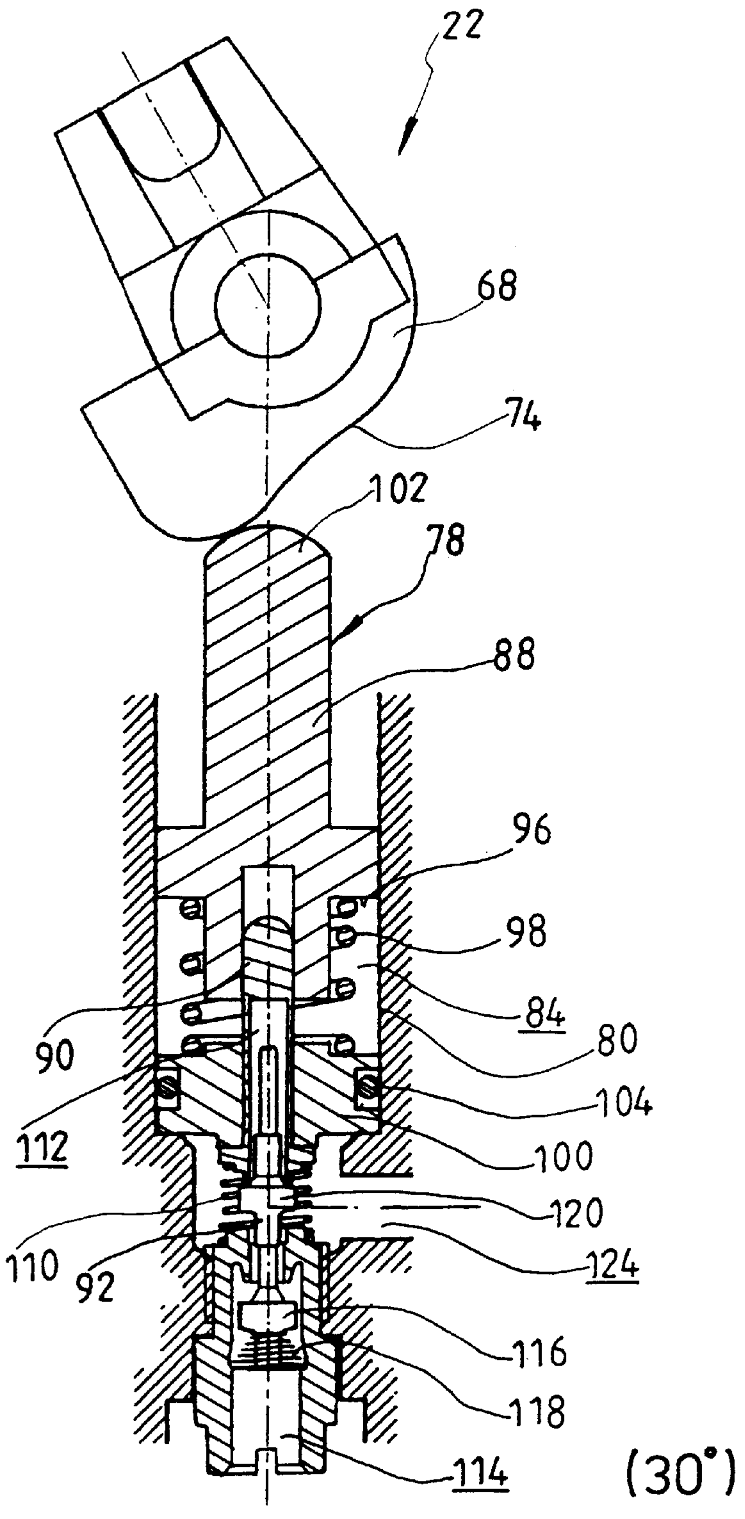
Figure 6C:
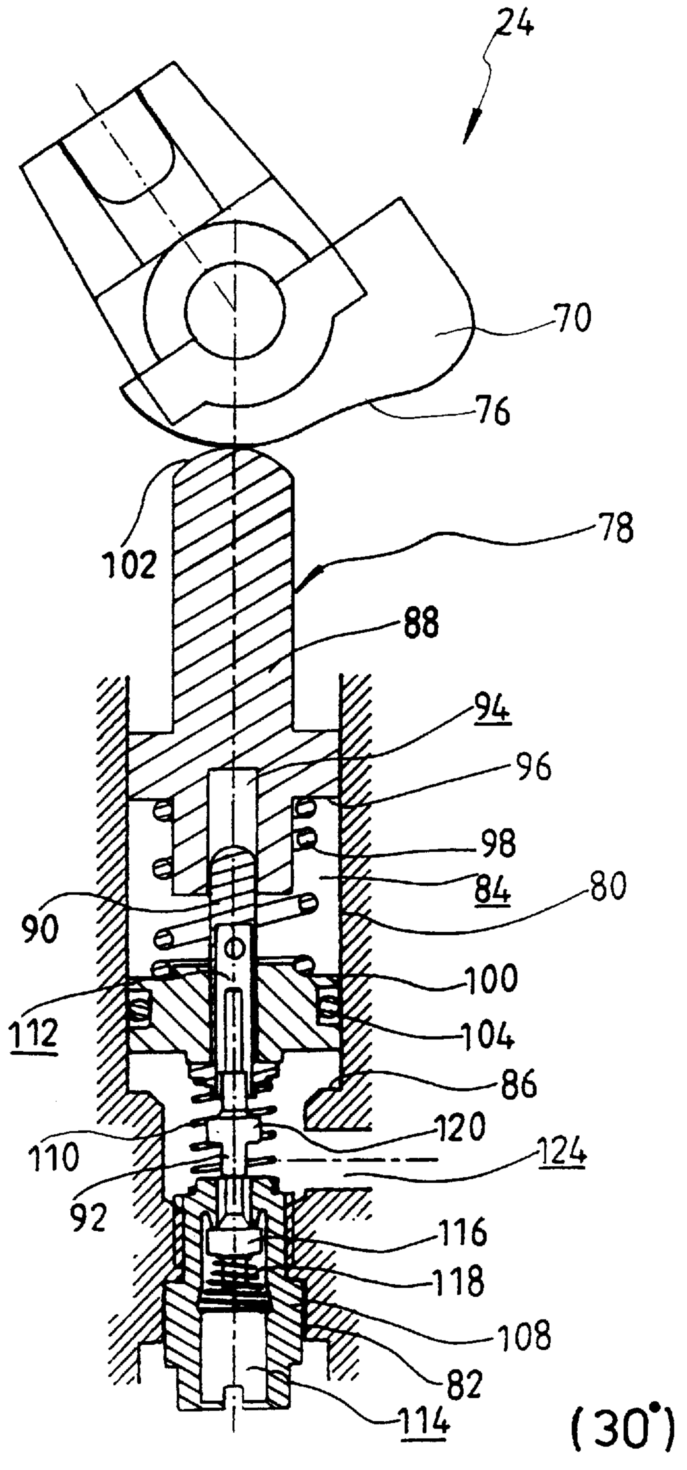
Figure 10C:
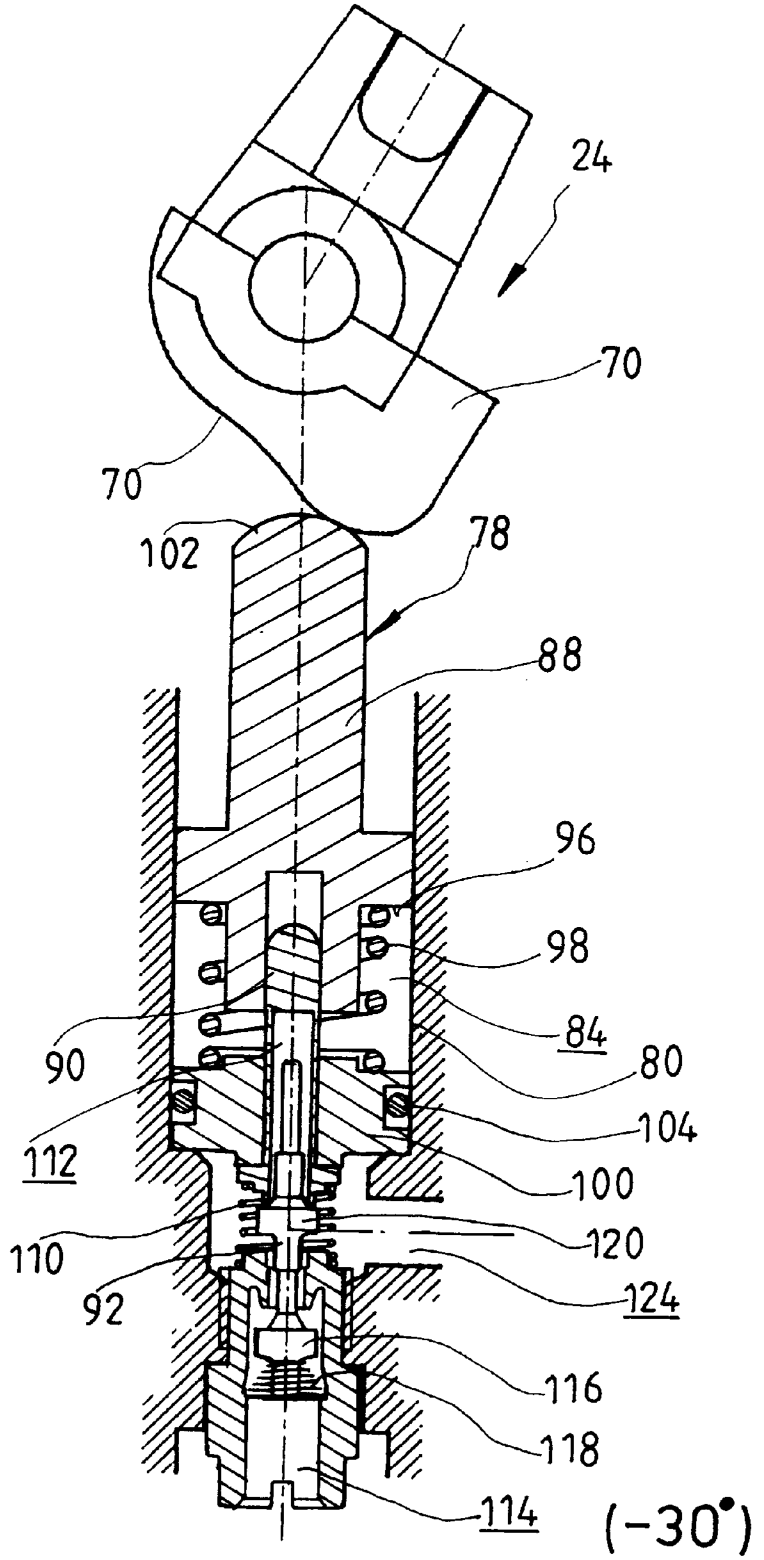

As shown, the first rod 88 has an internal channel 94 for movably receiving a portion of the second rod 90 therein. The first rod 88 has a circumferential shoulder 96 formed on an outer surface thereof for holding an end of a first spring 98 which has an opposite end supported on an expanded piston section 100 (also see FIG. 3A) of the second rod 90 so as to bias the piston section 100 away from the shoulder 96 of the first rod 88. The first rod 88 has an end on which a follower surface 102 engaging the camming surface 74 (or 76) of the cam 68 (or 70) so that when the direction control rod 14 is moved (for example from the neutral position to the forward position for the first direction control valve 22 or from the neutral position to the backward position for the second direction control valve 24), the first rod 88 of the acting rod assembly 78 is moved in a direction toward the second rod 90 which compresses the first spring 98. The compression of the first spring 98 causes the piston 100 (as well as the second rod 90) to move toward the circumferential shoulder 86 inside the bore 84 of the first section 80 and to get into contact therewith, as shown in FIGS. 6B and 10C.

A seal ring 104 is provided on the piston 100 (see FIG. 3A) to be located between the piston 100 and the bore 84 of the first section 80 for preventing leakages therebetween.

Figure 3B:
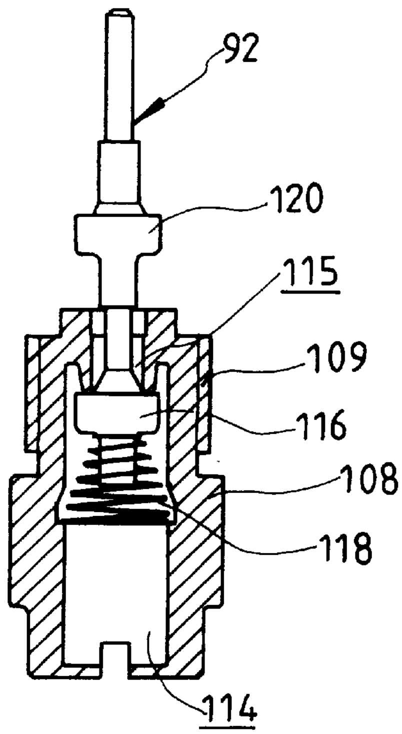
FIG. 3B is a cross-sectional view showing a third rod of the acting rod assembly of the direction control valve adapted in the pneumatic control assembly of the present invention.

An insertion 108 (also see FIG. 3B) is received and fixed inside the bore 84 of the first section 80 in any known means, such as by means of threading 109 formed thereon to engage inner threading of the bore 84. A second spring 110 is provided between the insertion 108 and the second rod 90. The spring 110 encompasses a portion of the third rod 92 of the acting rod assembly 78 and the third rod 92 has an end movably received within an internal channel 112 of the second rod 90 and an opposite end extending into an internal channel 114 of the insertion 108, see FIG. 3B. The third rod 92 has a first blockage plug 116 fixed thereon and located within the internal channel 114 of the insertion 108. The first blockage plug 116 is movable with the third rod 92 with respect to the internal channel 114 of the insertion 108. A third spring 118 is located within the internal channel 114 of the insertion 108, having an end fixed on the insertion 108 and an opposite end abutting against and thus biasing the first blockage plug 116 toward a throat 115 (see FIG. 3B) of the internal channel 114 for blocking the internal channel 114 which defines a normally closed valve. To provide a desired sealing effect, preferably the first blockage plug 116 is made of an elastically deformable material, such as rubber.

The first spring 98 has a spring constant greater than that of the second and third springs 110 and 118 so that when the direction control rod 14 is shifted from the neutral position to the forward position (for the first direction control valve 22) or the backward position (for the second direction control valve 24), the acting rod assembly 78 of the direction control rod 22 or 24 is depressed and thus causing the first rod 88 to move toward the second rod 90 and third rod 92 which compresses the first spring 98 and urges the piston 100 to move the second rod 90 of the acting rod assembly 78 toward the third rod 92. The third rod 92 has a second blockage plug 120 located between the insertion 108 and the piston 100 of the second rod 90 and movable with respect to the second rod 90 so that when the second rod 90 is driven by the first spring 98 toward the third rod 92 to cause the second spring 110 to be compressed to such an extent where the second blockage plug 120 gets into contact with the second rod 90 and thus seals the internal channel 112 of the second rod 90 which prevents the working fluid (a gas in this embodiment) from leaking through the internal channel 112 of the second rod 90. This will be further described. The second blockage plug 120 may also serve as a stop which fixes the second rod 90 to the third rod 92 so that when the first rod 88 is further depressed, the third spring 118 is compressed and drives the first blockage plug 116 away from the throat 115 of the internal channel 114 of the insertion 108 to open the channel 114.

The second section 82 is fixed to the first section 80. An inlet port 122 is formed on the second section 82 and in fluid communication with the internal channel 114 of the insertion 108 via an internal channel 106 of the second section 82 and an output port 124 is formed on the first second 80 to be in fluid communication with the bore 84 of the first section 80 and located between the piston 100 of the second rod 90 of the acting rod assembly 78 and the insertion 108 so that when the acting rod assembly 78 is actuated to drive the first blockage plug 116 in opening the internal channel 114, the working fluid of the direction control valve 22 or 24 flows into the valve 22 or 24 via the inlet port 122 and flows out of the valve 22 or 24 via the outlet port 124 to control the direction of supply of high pressure hydraulic fluid to the hydraulic power device.

The configuration of the control valve provides means for preventing the related parts from being damaged due to over-pressure of the working fluid and this is the so-called "constant pressure valve". In case that when the first blockage plug 116 is opened and the working fluid (gas) flowing into the control valve has a pressure greater than a predetermined threshold which is decided by the first spring 98, the total force that is applied by the gas pressure on the piston 100 will be greater than the biasing force of the first spring 98 and thus compress the first spring 98 to move the piston 100 upward. This reduces the compression of the second and third springs 110 and 118 caused by the first spring 98 and thus the blockage plug 116 is urged back to block the throat 115 of the internal channel 114 by the second and third springs 110 and 118. Thus, any over-pressure flowing into the direction control valve 22 or 24 causes the direction control valves 22 and 24 to be automatically shut off for protection purpose.

Due to the fact that when the direction control valve 22 or 24 is open, namely the throat 115 of the internal channel 114 is not blocked by the first blockage plug 116, the second blockage plug 120 seals against the internal channel 112 of the second rod 90, in case of over-pressure, any pressure inside the valve cannot be released through the internal channel 112 of the second rod 90 and due to the provision of the sealing ring 104 between the piston 100 and inner surface of the bore 84 of the first section 80, leakages around the piston 100 are also prohibited, any over-pressure of the working fluid inside the valve will completely act upon and urge the piston 100 upward to move the first blockage plug 116 toward the throat 115 of the channel 114, thus closing the channel 114.

To obtain the desired sealing effect, the second blockage plug 120 is preferably made of a material having an elastically deformable property, such as rubber.

Quite apparently, the valve configuration that was described with reference to the direction control valves 22 and 24 may also be adapted as the power control valve 20.

In the attached drawings, FIGS. 4B, 5B, 6B, 7B, 8B, 9B and 10B are illustrations of the first direction control valve 22 of which FIG. 6B shows the open condition and the remaining drawings show the closed condition. FIGS. 4C, 5C, 6C, 7C, 8C, 9C and 10C are illustrations of the second direction control valve 24 of which FIG. 10C shows the open condition and the remaining figures are the closed condition. Also, FIGS. 4A, 5A, 6A, 7A, 8A, 9A and 10A are corresponding drawings associated with the power control valve 20.

The operation of the pneumatic control assembly 10 of the present invention will be described with reference to FIGS. 4–10. As mentioned, the labels of these drawings with the suffix "A" are associated with the power control valve 20, suffix "B" the first direction control valve 22, and suffix "C" the second direction control valve 24, each drawing being related with a predetermined angle of the valve with the angle shown on the drawing. The numbering of these figures are given in order for a predetermined operation of the valves and will be descried in that order hereinafter.

Figure 5A:
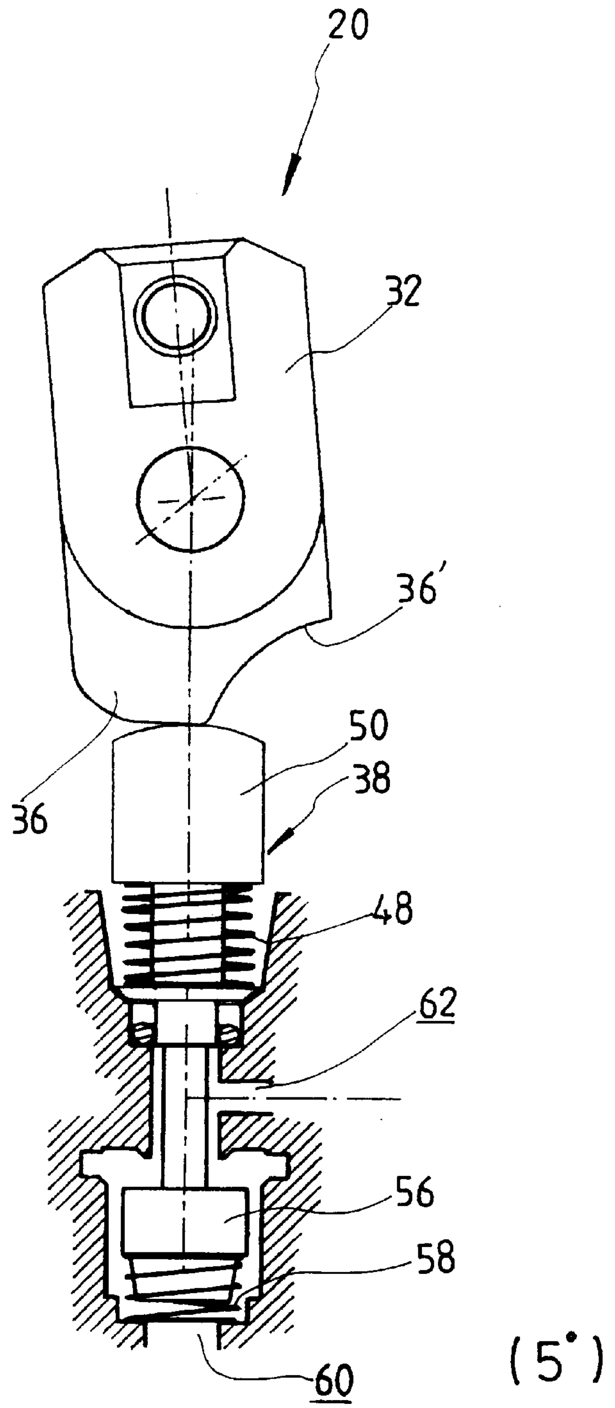
Figure 5B:
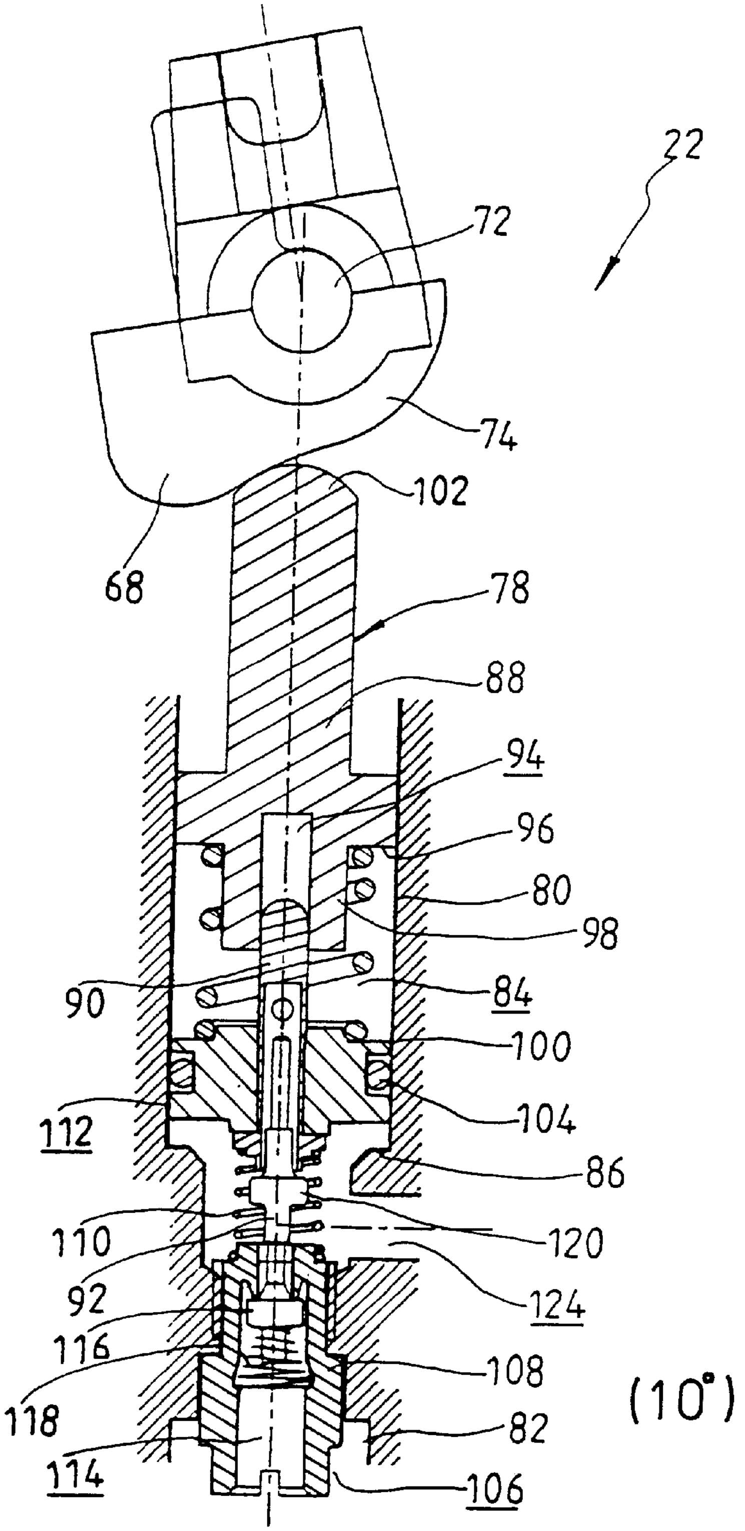
Figure 5C:
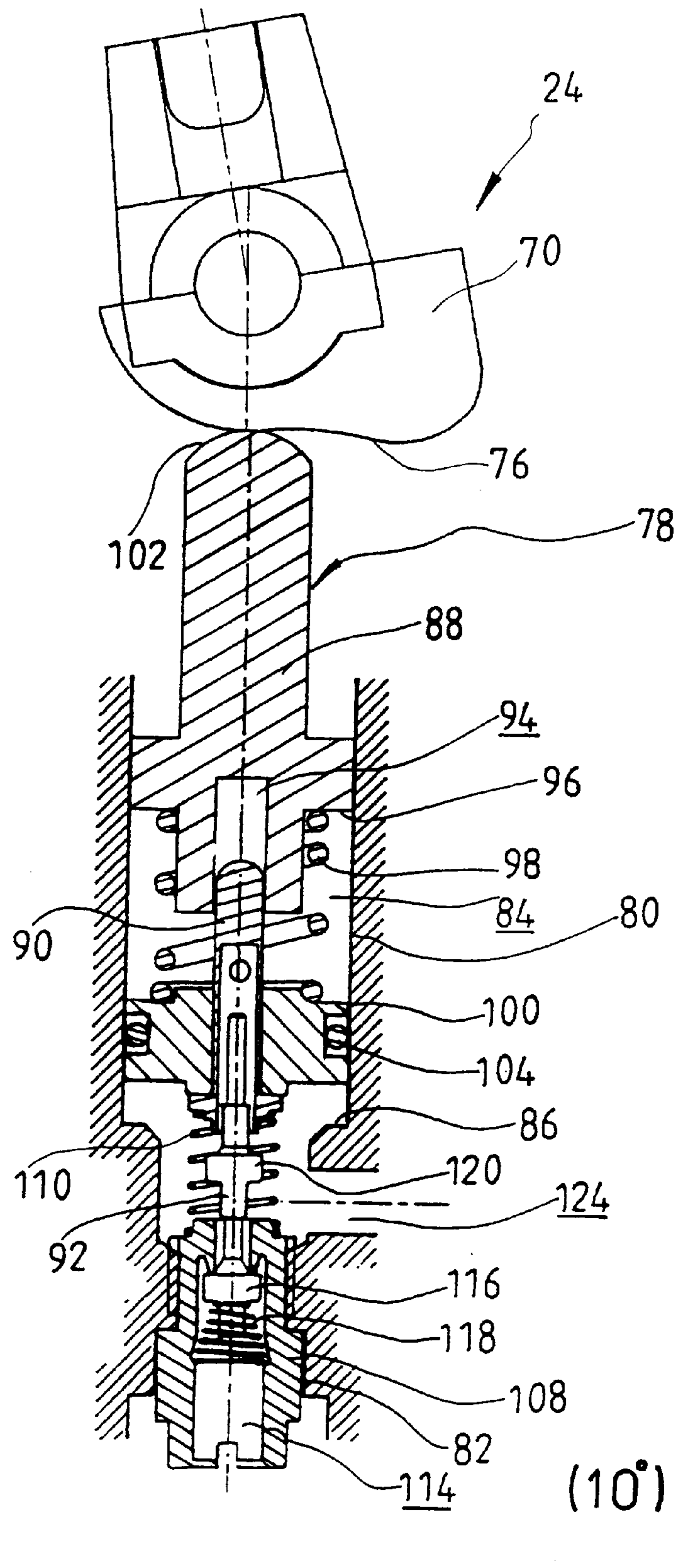
Figure 7A:
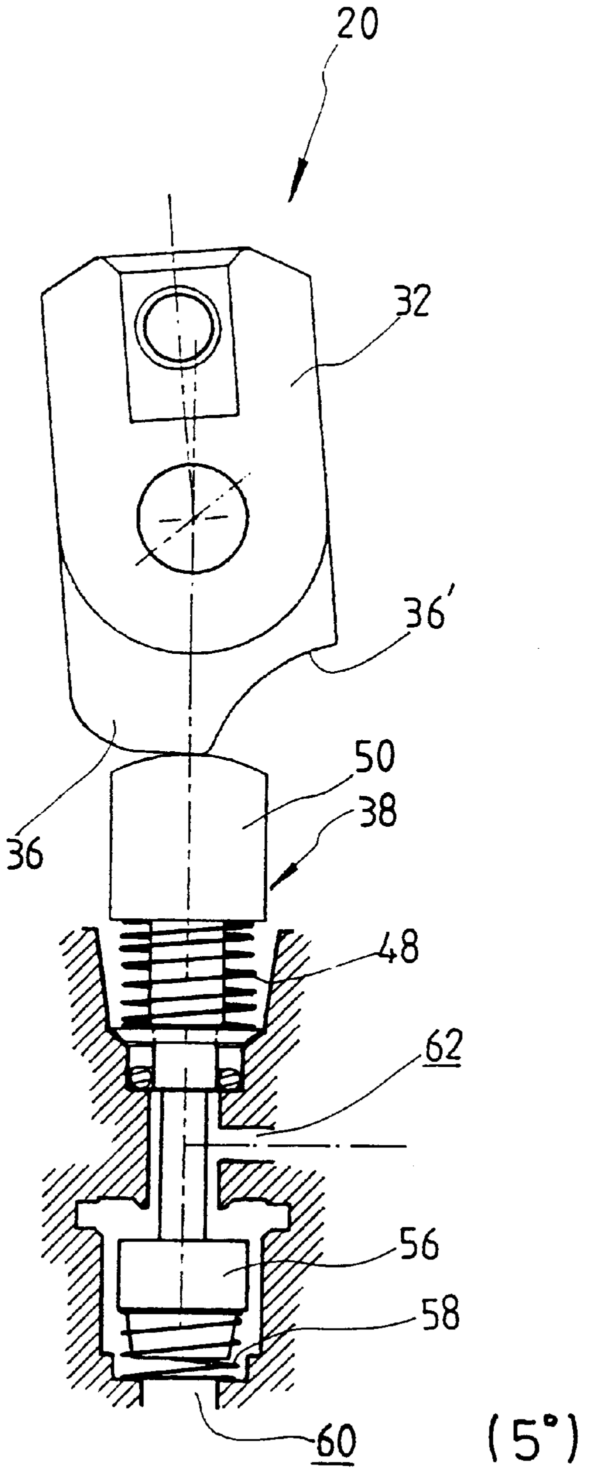
Figure 7B:
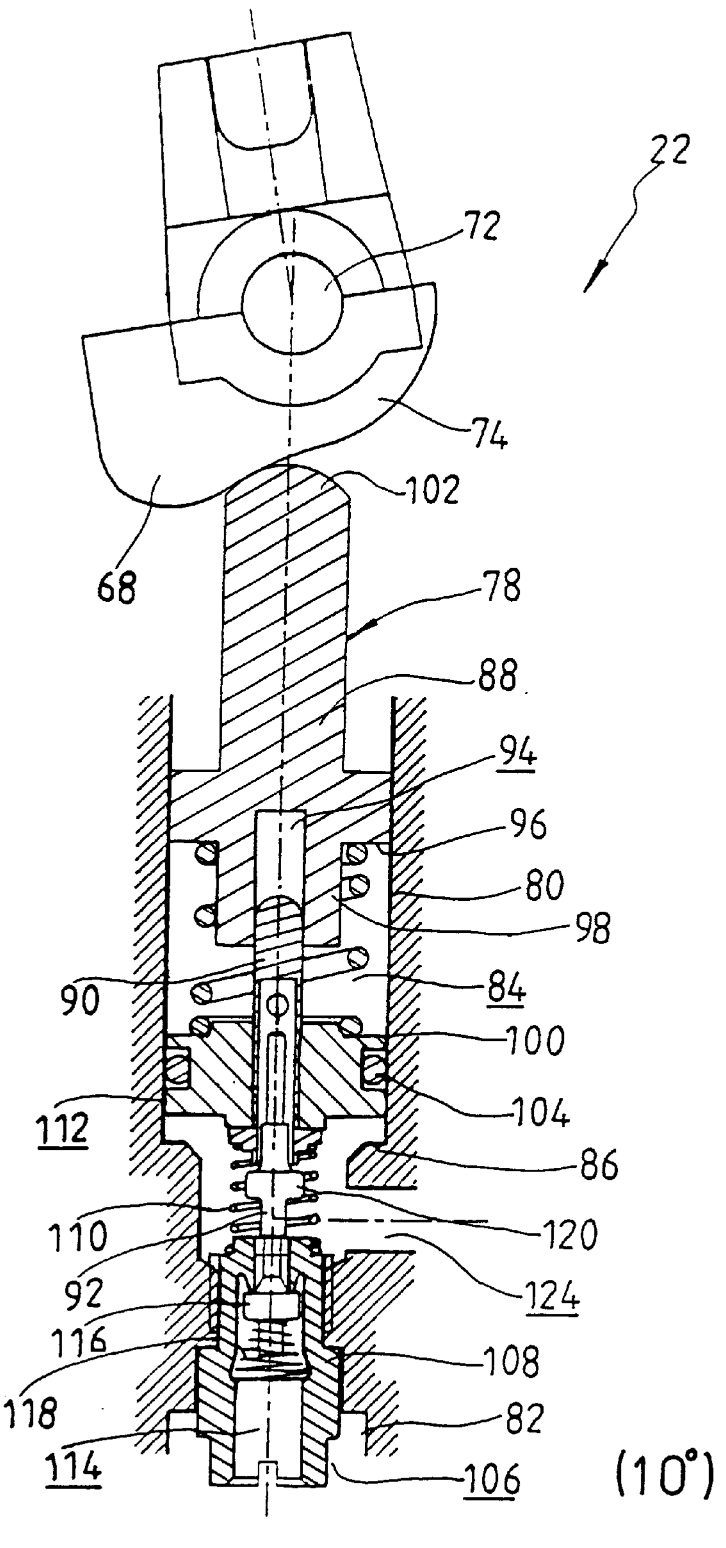
Figure 7C:
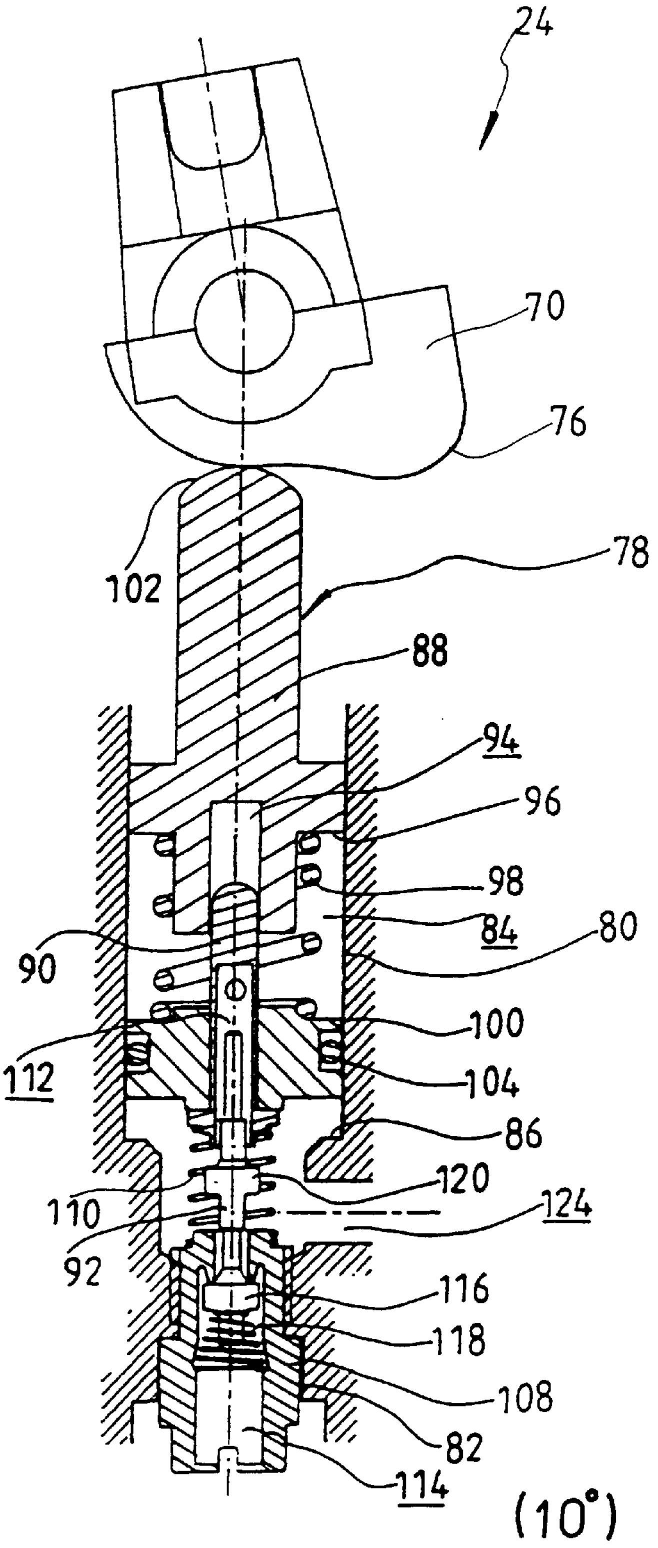
Figure 8A:
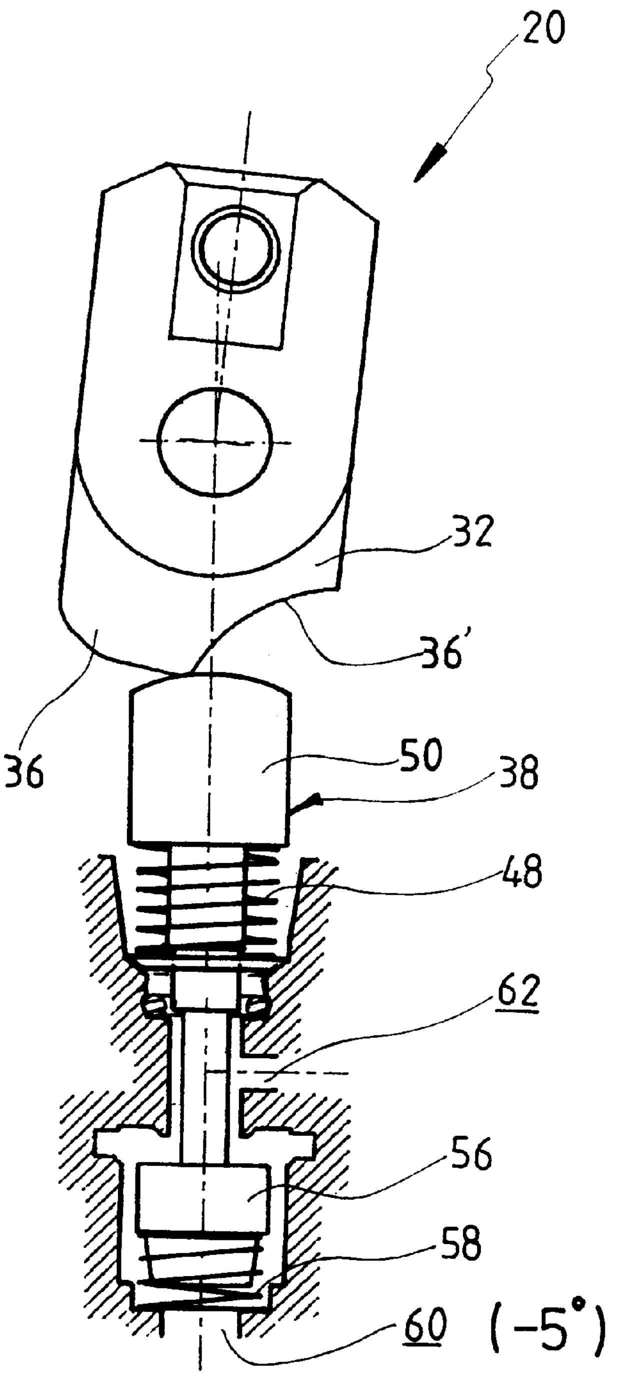
Figure 8B:
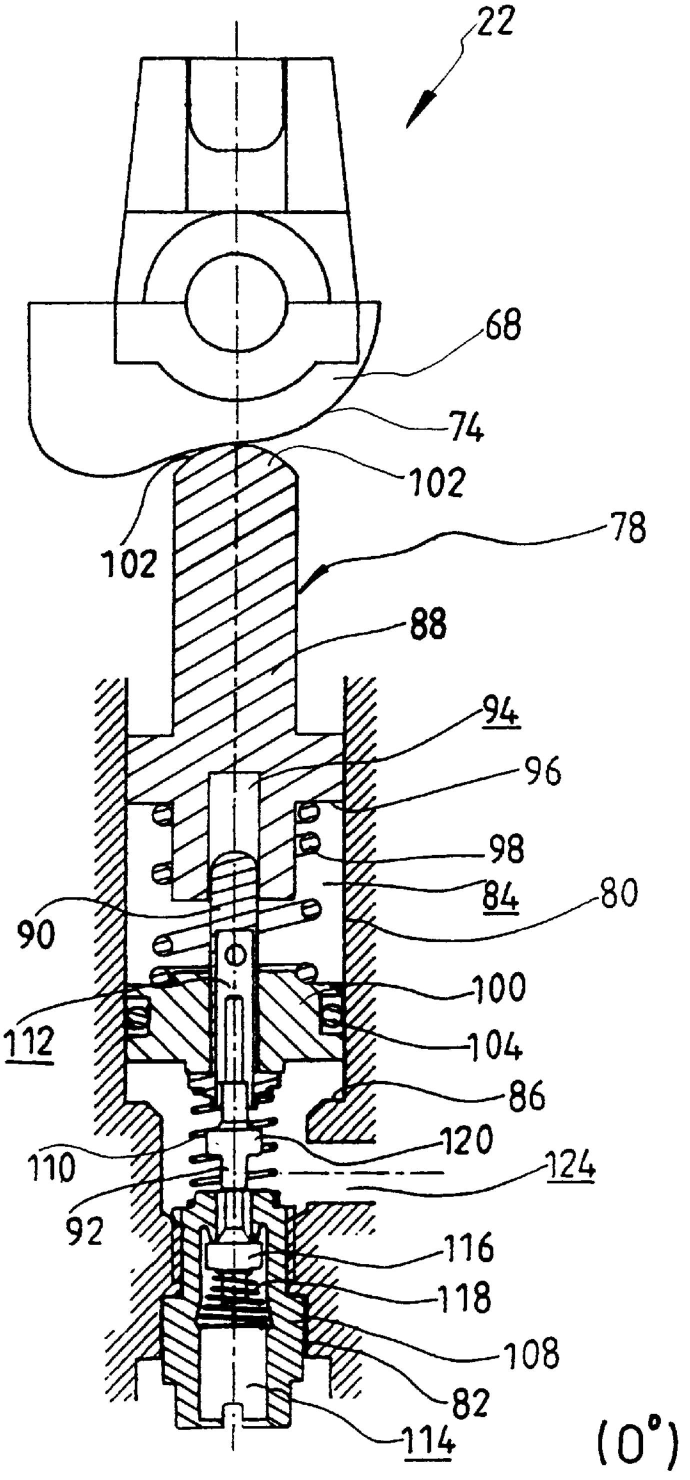
Figure 8C:
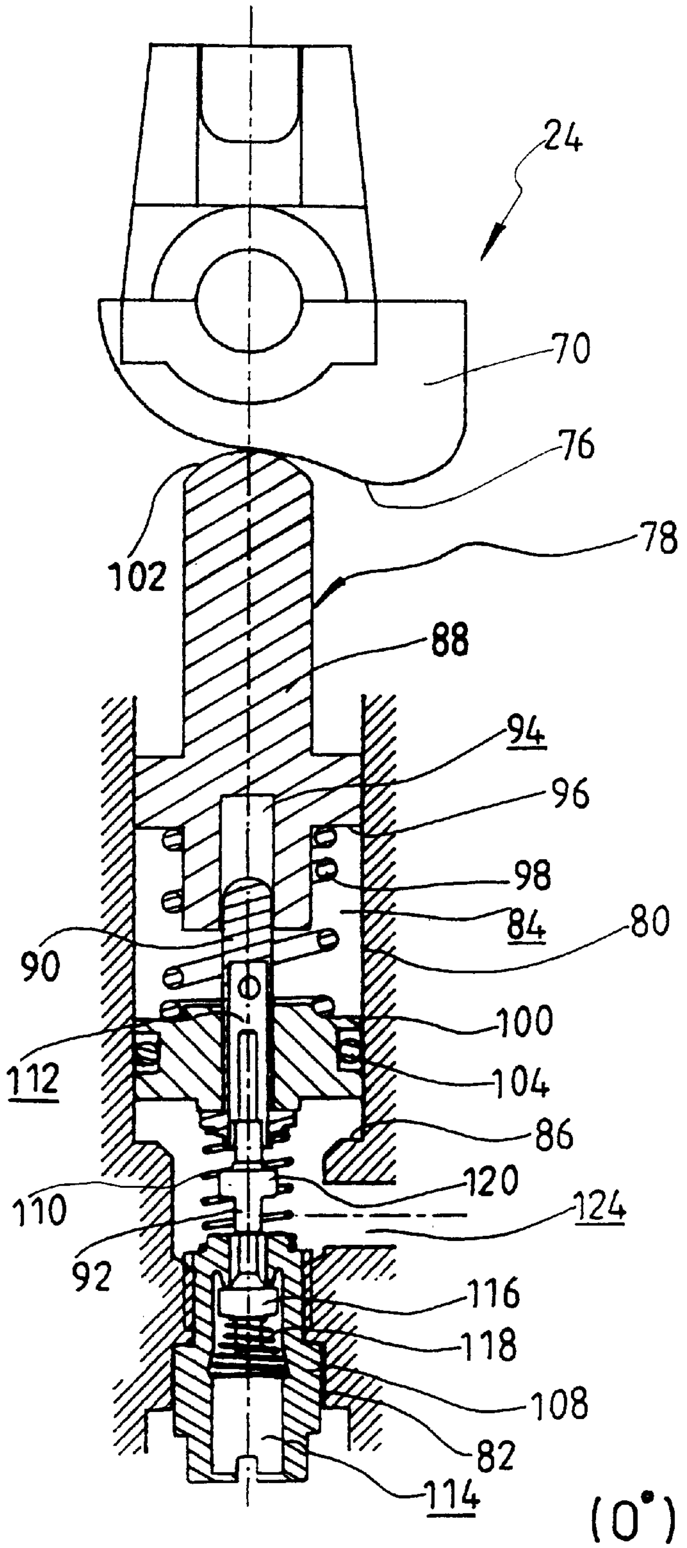

Referring to FIG. 4, the power control rod 12 is located at the disengaged position which is referred to as −35° with reference to a given reference base line (not shown) and the power control valve 20 is closed. The direction control rod 14 is located at the neutral position which is 10° with respect to the reference base line with both the first and second control valves 22 and 24 closed. Next, in FIG. 5, the power control rod 12 is moved to the engaged position which, in the embodiment illustrated, is 5° with respect to the reference base line to open the power control valve 20, as shown in FIG. 5A. The first and second direction control valves 22 and 24 are maintained closed. Thereafter, in FIG. 6, under the condition that the power control valve 20 is open, the direction control rod 14 is moved toward the forward position which is 30° with respect to the reference base line and the first direction control valve 22 is open, as shown in FIG. 6B. The status of the power control valve 20 and the second direction control valve 24 is unchanged. Next, the direction control rod 14 is moved back to the neutral position (10° position) and the first direction control valve 22 is closed, as shown in FIG. 7B. (It should be noted this situation is exactly the same as that shown in FIG. 5.)

Then, the direction control rod 14 is moved from the neutral position (10° position) to the backward position which is −30° with respect to the reference base line and when the direction control rod 14 is moved from the neutral position toward the backward position, the projection 28 that is provided on the direction control rod 14 is brought into contact engagement with the peg 26 on the power control rod 12 and thus urges the power control rod 12 to move with the direction control rod 14. The power control rod 12 is thus moved toward the transition point. As shown in FIG. 8, when the direction control rod 14 is moved backward a distance of 10 degrees which is measured as −10 degrees with respect to the reference base line, and reaches the position corresponding to 0° with respect to the reference base line, the power control rod 12 is also driven to move −10 degrees and reaches the position corresponding to −5°. In the embodiment illustrated, the −5° position defines the transition point of the power control rod 12.

In accordance with the present invention, the camming surface 36 of the cam 32 of the power control valve 20 is designed in such a way that when the power control rod 12 is moved in the backward direction to reach the transition point (−5° position in this case), it will fast move to the disengaged position (−35° position) by means of the cam 32 and the biasing spring 48. For example, the camming surface 36 may have a concave contour 36' (see FIG. 4A) which provides no physical contact or forcible engagement with the expanded end 50 of the acting rod 38 or is ineffective in controlling the movement of the acting rod 38 so that it allows the acting rod 38 to fast move upward to close the power control valve 20. As shown in FIG. 9, due to the quick movement of the power control rod 12 from the transition point toward the disengaged position, when the direction control rod 14 is moved toward the backward position, but does not exactly reach the backward position yet, the power control rod 12 will already reach the disengaged position (−35° position) earlier than the arrival of the direction control rod 14 at the backward position and thus a time elapse exists therebetween.

Further moving the direction control rod 14 in the backward direction will eventually have the direction control rod 14 arrive at the backward position (−30° position) and at this time, the second direction control valve 24 is open, as shown in FIG. 10C, and the power control valve 20 and the first direction control valve 22 are closed.

Although the invention has been described by means of the preferred embodiment thereof, it is apparent to those skilled in the art that many changes, variation and modifications are possible without departing from the scope of the invention as defined in the appended claims.

What is claimed is:

1. A pneumatic control assembly adapted to control a hydraulic power device, comprising a power control rod and at least one direction control rod of which the power control is movable between an engaged position and a disengaged position to activate/de-activate a hydraulic fluid supply source for supply of hydraulic fluid to the hydraulic power device and the direction control rod is movable among a forward position, a neutral position, and a backward position wherein the forward position corresponds to driving the hydraulic power device in a working stroke to work, the backward position corresponds to moving the hydraulic power device in a returning stroke and the neutral position is between the forward position and backward position and corresponding to having the hydraulic power device maintained stationary, the improvements comprising that a peg is provided on the power control rod and the direction control rod has a projection arranged and dimensioned corresponding to the peg so that when the direction control rod is moved from the neutral position toward the backward position, the peg is drivingly engageable by the projection of the direction control rod in order to drive the power control rod to move with the direction control rod from the engaged position toward the disengaged position.

2. The pneumatic control assembly as claimed in claim 1, wherein a power control valve is coupled to and operated by the power control rod to switch between an open condition where a working fluid is allowed to flow through the power control valve to activate the hydraulic fluid supply source and a closed condition where the working fluid is prohibited from flowing through the power control valve.

3. The pneumatic control assembly as claimed in claim 1, wherein a first direction control valve and a second direction control valve are coupled to and operated by the direction control rod to be respectively switched between an open condition and a closed condition and wherein when the direction control rod is at the forward position, the first direction control valve is open and the second direction control rod is closed, when the direction control rod is at the backward position, the first direction control valve is closed and the second direction control rod is open and when the direction control rod is at the neutral position, both the first direction control valve and the second direction control valve are closed, the first direction control valve and the second direction control valve respectively allowing the hydraulic fluid from the hydraulic fluid supply source to flow therethrough toward different ports of the hydraulic power device when the valves are open.

4. The pneumatic control assembly as claimed in claim 2, wherein the working fluid comprises a gas.

5. The pneumatic control assembly as claimed in claim 3, wherein the working fluid comprises a gas.

6. The pneumatic control assembly as claimed in claim 4, wherein the gas is compressed air.

7. The pneumatic control assembly as claimed in claim 5, wherein the gas is compressed air.

8. The pneumatic control assembly as claimed in claim 1, wherein the power control rod comprises locking means for releasably securing the power control rod at the disengaged position.

9. The pneumatic control rod as claimed in claim 8, further comprising a support member to support the power control rod and direction control rod movably mounted thereon, the support member comprising an elongated slot having a length and a width for receiving the power control rod therein, the slot having two lengthwise ends respectively corresponding to the engaged position and the disengaged position of the power control rod, the power control rod comprising an elongated bar having a cross-sectional size smaller than the width of the slot so as to allow the bar to be received therein in a movable manner by extending the bar in a direction substantially normal to the slot and the support member, the power control rod comprising a locking member movably fit over the bar with a locking ring formed on one end thereof, the locking ring having a size greater than the width of the slot, a biasing element being provided on the bar to bias the locking member in such a way to have the locking ring abut against the support member, the locking means further comprising a locking hole formed on one of the ends of the slot which corresponds to the disengaged position, the hole having a diameter corresponding to the locking ring so as to have the locking ring receivable therein by the locking ring being biased by the biasing element and thus securing the power control rod at the disengaged position, the locking member being manually movable against the basing element to disengage the locking ring from the locking hole so as to release the power control rod from the disengaged position thereof.

10. The pneumatic control assembly as claimed in claim 1, wherein the direction control rod comprises locking means for selectively releasably securing the direction control rod at any one of the forward position, the neutral position and the backward position.

11. The pneumatic control rod as claimed in claim 10, further comprising a support member to support the power control rod and direction control rod movably mounted thereon, the support member comprising an elongated slot having a length and width for receiving the direction control rod therein, the slot having two lengthwise ends respectively corresponding to the forward position and the backward position of the direction control rod, the neutral position being provided on the slot at a position between the two ends, the direction control rod comprising an elongated bar having a cross-sectional size smaller than the width of the slot so as to allow the bar to be received therein in a movable manner by extending the bar in a direction substantially normal to the slot and the support member, the direction control rod comprising a locking member movably fit over the bar with a locking ring formed on one end thereof, the locking ring having a size greater than the width of the slot, a biasing element being provided on the bar to bias the locking member in such a way to have the locking ring abut against the support member, the locking means further comprising a locking hole formed on the slot at a position corresponding to each of the forward position, the neutral position and the backward position, the hole having a diameter corresponding to the locking ring so as to have the locking ring receivable therein by the locking ring being biased by the biasing element and thus securing the direction control rod at the position of the hole along the slot, the locking member being manually movable against the biasing element to disengage the locking ring from the locking hole so as to release the direction control rod.

12. The pneumatic control assembly as claimed in claim 1, wherein the power control rod comprises means for quickly moving the power control rod to the disengaged position when the power control rod is driven by the direction control rod from the engaged position toward the disengaged position so as to have the power control rod reach the disengaged position earlier than when the direction control rod reaches the backward position.

* * * * *